United States Patent
Kirsch et al.

(10) Patent No.: US 11,257,509 B2
(45) Date of Patent: Feb. 22, 2022

(54) TECHNIQUES FOR EMPIRICAL MODE DECOMPOSITION (EMD)-BASED SIGNAL DE-NOISING USING STATISTICAL PROPERTIES OF INTRINSIC MODE FUNCTIONS (IMFS)

(71) Applicant: The University of New Hampshire, Durham, NH (US)

(72) Inventors: Nicholas J. Kirsch, Portsmouth, NH (US); Mahdi H. Al-Badrawi, Durham, NH (US); Bessam Z. Al-Jewad, Madbury, NH (US)

(73) Assignee: THE UNIVERSITY OF NEW HAMPSHIRE, Durham, NH (US)

( * ) Notice: Subject to any disclaimer, the term of this patent is extended or adjusted under 35 U.S.C. 154(b) by 243 days.

(21) Appl. No.: 16/198,255

(22) Filed: Nov. 21, 2018

(65) Prior Publication Data
US 2019/0164564 A1    May 30, 2019

Related U.S. Application Data

(63) Continuation of application No. PCT/US2017/034017, filed on May 23, 2017.
(Continued)

(51) Int. Cl.
*G10L 21/0232* (2013.01)
*G06F 17/14* (2006.01)
(Continued)

(52) U.S. Cl.
CPC .......... *G10L 21/0232* (2013.01); *G06F 17/14* (2013.01); *G06N 7/005* (2013.01);
(Continued)

(58) Field of Classification Search
CPC ..... G06F 17/14; G10L 15/20; G10L 21/0216; G10L 21/0232; G10L 21/0264; G06N 7/005
(Continued)

(56) References Cited

U.S. PATENT DOCUMENTS 6,901,353 B1 *  5/2005  Huang ................. G06F 17/141
                                                    702/104
8,660,848 B1 *  2/2014  Humi .................... G01V 1/008
                                                    704/270
(Continued)

OTHER PUBLICATIONS

L. Zao et al. "Speech Enhancement with EMD and Hurst-Based Mode Selection," IEEE/ACM Transactions on Audio, Speech, and Language Processing, vol. 22, No. 5, May 2014. (Year: 2014).*
(Continued)

*Primary Examiner* — Richemond Dorvil
*Assistant Examiner* — Rodrigo A Chavez
(74) *Attorney, Agent, or Firm* — Grossman, Tucker, Perrault & Pfleger, PLLC

(57) ABSTRACT

Techniques for EMD-based signal de-noising are disclosed that use statistical characteristics of IMFs to identify information-carrying IMFs for the purposes of partially reconstructing the identified relevant IMFs into a de-noised signal. The present disclosure has identified that the statistical characteristics of IMFs with noise tend to follow a generalized Gaussian distribution (GGD) versus only a Gaussian or Laplace distribution. Accordingly, a framework for relevant IMF selection is disclosed that includes, in part, performing a null hypothesis test against a distribution of each IMF derived from the use of a generalized probability density function (PDF). IMFs that contribute more noise than signal may thus be identified through the null hypothesis test. Conversely, the aspects and embodiments disclosed herein enable the determination of which IMFs have a
(Continued)

contribution of more signal than noise. Thus, a signal may be partially reconstructed based on the predominately information-carrying IMFs to result in de-noised output signal.

19 Claims, 16 Drawing Sheets

Related U.S. Application Data

(60) Provisional application No. 62/340,495, filed on May 23, 2016.

(51) Int. Cl.
  *G10L 15/20* (2006.01)
  *G10L 21/0216* (2013.01)
  *G06N 7/00* (2006.01)
  *G10L 21/0264* (2013.01)

(52) U.S. Cl.
  CPC .......... *G10L 15/20* (2013.01); *G10L 21/0216* (2013.01); *G10L 21/0264* (2013.01)

(58) Field of Classification Search
  USPC ........................................................ 704/219
  See application file for complete search history.

(56) References Cited

U.S. PATENT DOCUMENTS

2003/0033094 A1\* 2/2003 Huang .................... G06F 17/14
  702/39
2004/0078160 A1\* 4/2004 Frei ..................... G06K 9/00503
  702/79

OTHER PUBLICATIONS

Ryosuke Sugiura et al. "Optimal Coding of Generalized-Gaussian-Distributed Frequency Spectra for Low-Delay Audio Coder With Powered All-Pole Spectrum Estimation," IEEE/ACM Transactions on Audio, Speech, and Language Processing, vol. 23, No. 8, Aug. 2015. (Year: 2015).\*

Daoud Boutana, M. Benidir, and B. Barkat. 2011. Denoising and characterization of heart sound signals using optimal intrinsic mode functions. In Proceedings of the 4th International Symposium on Applied Sciences in Biomedical and Communication Technologies (ISABEL '11). (Year: 2011).\*

\* cited by examiner

702 → 700

| Distributions | H-values of IMF indices ||||||||||
|---|---|---|---|---|---|---|---|---|---|---|
| | 1 | 2 | 3 | 4 | 5 | 6 | 7 | 8 | 9 | 10 |
| Laplace | 1 | 0 | 0 | 0 | 0 | 0 | 0 | 1 | 1 | 1 |
| Hyperbolic | 1 | 0 | 0 | 0 | 0 | 0 | 0 | 1 | 1 | 1 |
| Logistic | 1 | 0 | 0 | 0 | 0 | 0 | 0 | 1 | 1 | 1 |
| Normal | 1 | 0 | 0 | 0 | 0 | 0 | 0 | 0 | 1 | 1 |
| Raised cosine | 1 | 0 | 0 | 0 | 0 | 0 | 0 | 1 | 0 | 1 |
| Wigner | 1 | 0 | 0 | 0 | 0 | 0 | 0 | 1 | 0 | 1 |
| Uniform | 1 | 0 | 0 | 0 | 0 | 1 | 1 | 1 | 1 | 1 |

FIG. 7

| SNR (dB) | IMF index |||||||||||||||||||| 
|---|---|---|---|---|---|---|---|---|---|---|---|---|---|---|---|---|---|---|---|---|
| | 1 || 2 || 3 || 4 || 5 || 6 || 7 || 8 || 9 || 10 ||
| | H | B | H | B | H | B | H | B | H | B | H | B | H | B | H | B | H | B | H | B |
| -10 | 1 | 3 | 0 | 1.56 | 0 | 1.73 | 0 | 1.58 | 0 | 1.25 | 0 | 1.13 | 0 | 1.30 | 1 | 2.32 | 1 | 2.83 | 1 | 2.41 |
| -5 | 1 | 3 | 0 | 1.63 | 0 | 1.87 | 0 | 1.53 | 0 | 1.31 | 0 | 1.16 | 0 | 1.44 | 1 | 2.74 | 1 | 2.92 | 1 | 2.48 |
| 0 | 1 | 3 | 0 | 1.55 | 0 | 1.74 | 0 | 1.49 | 0 | 1.19 | 0 | 1.14 | 0 | 1.63 | 1 | 2.96 | 1 | 2.99 | 1 | 2.54 |
| 5 | 1 | 3 | 0 | 1.69 | 0 | 1.75 | 0 | 1.56 | 0 | 1.27 | 0 | 1.12 | 1 | 2.19 | 1 | 3 | 1 | 2.96 | 1 | 2.53 |
| 10 | 1 | 3 | 0 | 1.58 | 0 | 1.74 | 0 | 1.46 | 0 | 1.22 | 0 | 1.08 | 1 | 2.56 | 1 | 3 | 1 | 3 | 1 | 2.56 |

FIG. 8

TABLE I: Null hypothesis (H) and shape paramter ($\beta$) of different random variable pdfs.

| pdf | IMF index | | | | | | | | | | | | | | | | | | | |
|---|---|---|---|---|---|---|---|---|---|---|---|---|---|---|---|---|---|---|---|---|
| | 1 | | 2 | | 3 | | 4 | | 5 | | 6 | | 7 | | 8 | | 9 | | 10 | |
| | H | $\beta$ | H | $\beta$ | H | $\beta$ | H | $\beta$ | H | $\beta$ | H | $\beta$ | H | $\beta$ | H | $\beta$ | H | $\beta$ | H | $\beta$ |
| Normal | 1 | 3 | 0 | 2 | 0 | 2 | 0 | 1 | 0 | 1.17 | 0 | 1.7 | 0 | 1 | 0 | 1.29 | 0 | 2.6 | 1 | 3 |
| Uniform | 1 | 3 | 0 | 2 | 0 | 2 | 0 | 2 | 0 | 1 | 0 | 1.06 | 0 | 1 | 0 | 1.26 | 1 | 3 | 0 | 1.24 |
| Laplace | 1 | 3 | 0 | 1.01 | 0 | 1 | 0 | 1 | 0 | 1.04 | 0 | 1 | 0 | 1.3 | 1 | 3 | 0 | 1.21 | 1 | 3 |
| Logistic | 1 | 1 | 0 | 2 | 0 | 2 | 0 | 2 | 0 | 1 | 0 | 1.13 | 0 | 1.58 | 0 | 1.12 | 0 | 1.22 | 0 | 1 |
| Wigner | 1 | 3 | 0 | 1.08 | 0 | 1.14 | 0 | 1 | 0 | 1.1 | 0 | 1.01 | 0 | 1.07 | 0 | 2.62 | 1 | 3 | 1 | 3 |
| Hyperbolic secant | 1 | 3 | 0 | 1 | 0 | 1.02 | 0 | 2 | 0 | 2 | 0 | 1.27 | 0 | 1 | 0 | 1.06 | 0 | 1.23 | 1 | 3 |
| Raised Cosine | 1 | 3 | 0 | 1 | 0 | 2 | 0 | 1.17 | 0 | 1.01 | 0 | 1.07 | 0 | 1 | 0 | 1.55 | 0 | 1.14 | 1 | 3 |

FIG. 22

TECHNIQUES FOR EMPIRICAL MODE DECOMPOSITION (EMD)-BASED SIGNAL DE-NOISING USING STATISTICAL PROPERTIES OF INTRINSIC MODE FUNCTIONS (IMFS)

CROSS REFERENCE TO RELATED APPLICATION

The present application is a continuation of International Patent Application No. PCT/US2017/034017, filed May 23, 2017, designating the U.S., and claims the benefit of the filing date of U.S. Provisional Application Ser. No. 62/340,495, filed May 23, 2016, the entire teachings of which are hereby incorporated herein by reference.

TECHNICAL FIELD

The present disclosure relates to signal processing, and more particularly, to techniques for using empirical mode decomposition (EMD) for signal de-noising.

BACKGROUND

A signal often carries both meaningful information, e.g., data, and some amount of noise. Approaches to data analysis techniques that aim to extract the meaningful information, such as wavelet analysis and Fourier Transforms, depend on certain presumptions about a processed signal in order to derive basis functions. Accordingly, and in a general sense, these approaches require a priori knowledge of a signal to operate effectively.

In contrast, Empirical Mode Decomposition (EMD) is a method of decomposing a signal in the time-domain to generate a set of intrinsic mode functions (IMFs), with the IMFs being derived directly from samples of a processed signal. EMD may be accurately understood to utilize a so-called "data driven" approach that overcomes certain limitations that impact the efficacy of other approaches which depend on "knowing" something about the processed signal beforehand. Thus one of the key distinguishing features of EMD is that IMFs are derived from the signal itself and are not predefined like the basis functions that characterize other such signal decomposition methods. For this reason, EMD operates particularly well on signal data that is non-stationary and non-linear. However, EMD remains largely an algorithmic, empirical approach that raises non-trivial challenges in real-world signal processing applications.

BRIEF DESCRIPTION OF THE DRAWINGS

Reference should be made to the following detailed description which should be read in conjunction with the following figures, wherein like numerals represent like parts:

FIG. 7 is a table that represents null hypothesis (H) values for different input signal distributions, in accordance with an embodiment of the present disclosure.

FIG. 8 is another table that represents null hypothesis (H) and $\beta$ values for a set of IMF indices over a range of signal-to-noise ratio (SNR) levels, in accordance with an embodiment of the present disclosure.

FIG. 22 shows results of a null hypothesis test and corresponding shape parameter $\beta$ for different random variable PDFs in accordance in accordance with an embodiment of the present disclosure.

DETAILED DESCRIPTION

Figure 1:
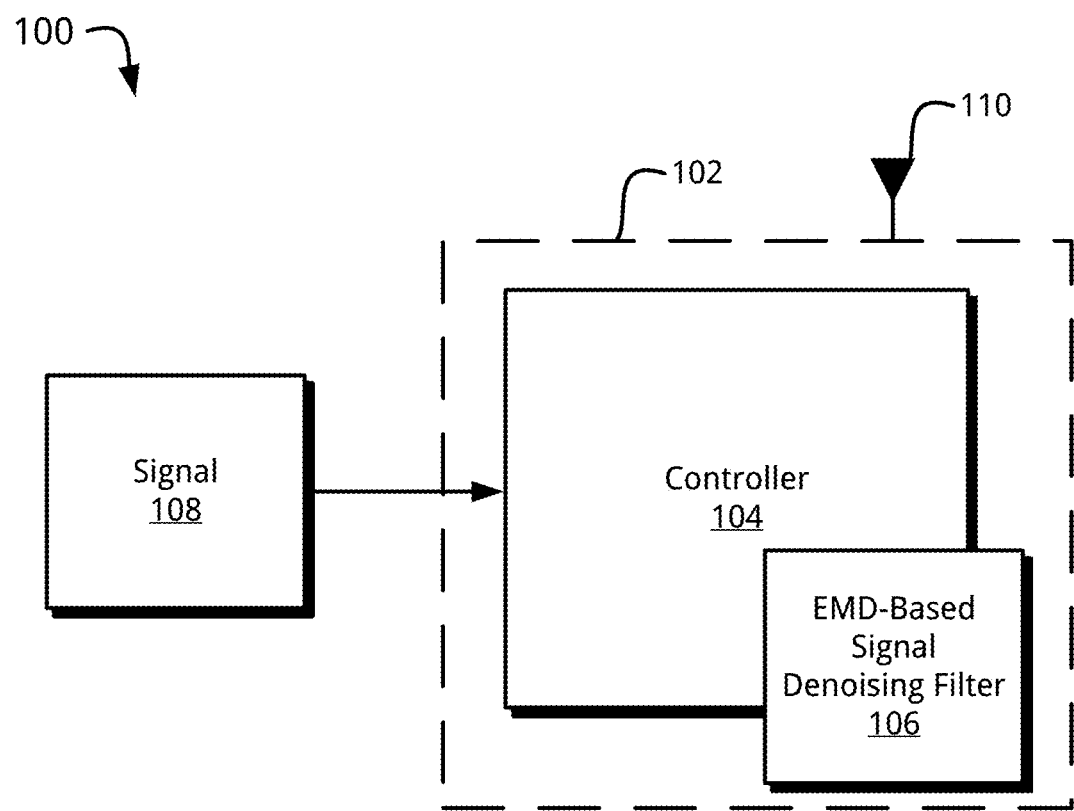
FIG. 1 is a block diagram of one embodiment of a system consistent with the present disclosure.

Approaches to de-noising of a signal using Empirical Mode Decomposition (EMD) show promise over other approaches, such as linear filters (e.g., Wiener filter) and transform approaches (Wavelet transform). This is due, in part, to EMD's blind behavior toward the signal nature, e.g., linearity and stationarity, and its data-driven adaptability. However, and as discussed above, EMD raises numerous non-trivial challenges by virtue of its ability to naturally and empirically adapt to a processed signal. For example, consider that the present disclosure has identified EMD tends to extract roughly the noisy part of a processed signal in the lower-order (or lower-indexed) Intrinsic Mode Functions (IMFs). This behavior leaves the remaining, or higher-order, IMFs carrying the useful information of the signal. Accordingly, EMD-based de-noising selectively operates, in part, by selecting those information carrying IMFs to the exclusion of the noise-carrying IMFs. However, such a selection process is complicated by the non-linear filtering nature of EMD. The complexity of selecting the relevant IMFs is due, at least in part, to the non-linear structure of EMD in which the cut-off frequency of each IMF is a function of the signal type, noise power and the sampling rate, for example. Other EMD approaches are without a theoretical basis to define EMD output (e.g., IMFs), and thus, remain unable to transcend the limits of EMD's empirical definition.

Thus, in accordance with an embodiment of the present disclosure, techniques for EMD-based signal de-noising are disclosed that use statistical characteristics of IMFs to identify relevant, information-carrying IMFs (e.g., noise-free IMFs) for the purposes of partially reconstructing the identified relevant IMFs into a resulting de-noised signal. Aspects and embodiments of the present disclosure are thus not limited by the empirical nature of EMD, as discussed above, and instead use a statistical interpretation of IMFs to perform partial reconstruction for de-noising purposes. In more detail, the present disclosure has identified that the statistical characteristics of IMFs with noise, such as white Gaussian noise (wGn), tend to follow a generalized Gaussian distribution (GGD) versus only a Gaussian or Laplace distribution. Accordingly, aspects and embodiments disclosed herein provide a framework for relevant IMF selection that includes, in part, performing a null hypothesis test against a distribution of each IMF derived from the use of a generalized probability density function (PDF). Stated differently, aspects and embodiments disclosed herein utilize GGD to identify noisy IMFs, e.g., IMFs that contribute more noise than signal, even when those noisy IMFs do not necessarily follow a normal distribution. Conversely, the aspects and embodiments disclosed herein enable the determination of which IMFs have a contribution of more signal than noise. Thus a signal may be partially reconstructed based on the relevant, information-carrying IMFs to produce a de-noised output signal.

The aspects and embodiments disclosed herein may be utilized in a wide-range of signal processing applications. For example, the techniques for EMD-based signal de-noising disclosed herein may be used in biomedical applications such as electrocardiogram (ECG) processing, seismology applications, and voice processing and enhancement applications, just to name a few. However, the techniques for EMD-based signal de-noising disclosed herein may be used against virtually any signal in which noise is present, and this disclosure is not necessarily limited to the specific examples applications provided herein.

Example EMD-Based Signal De-Noising System and Operation

FIG. 1 is a simplified block diagram of one embodiment of an EMD-based de-noising system 100 consistent with the present disclosure. The system 100 has been depicted as a highly simplified system for ease of explanation. The system 100 comprises a computing device 102 (or device 102) that includes a controller 104 and a EMD-based signal de-noising filter 106 or stage. The device 102 may comprise, for example, a mobile computing device such as a smartphone or laptop, or any other suitable computing device. In some cases, the device 102 is implemented as specialized hardware (e.g., circuitry), software, or any combination thereof. The specialized hardware/software may then be implemented within other devices, e.g., radio transceiver devices, audio processing systems, and so on, for the purposes of performing EMD-based signal denoising as variously disclosed herein.

The controller 104 comprises at least one processing device/circuit such as, for example, a digital signal processor (DSP), a field-programmable gate array (FPGA), Reduced Instruction Set Computer (RISC) processor, x86 instruction set processor, microcontroller, an application-specific integrated circuit (ASIC). The EMD-based signal de-noising filter 106 may be integrated within the controller 104 or may comprise separate chips/circuitry. For example, the EMD-based signal de-noising filter 106 may be implemented, for example, using software (e.g., C or C++ executing on the controller/processor 104), hardware (e.g., hardcoded gate level logic or purpose-built silicon) or firmware (e.g., embedded routines executing on a microcontroller), or any combination thereof. The EMD-based signal de-noising filter 106 may be configured to filter noise from a processed signal and partially reconstruct the same, e.g., with at least a portion of noise removed. In one embodiment, the controller 104 and/or the EMD-based signal de-noising filter 106 may be configured to carry out the EMD processes as discussed in greater detail below with reference to FIGS. 5, 6 and 21.

The signal 108 may comprise any electrical quantity or effect (e.g., current, voltage, or electromagnetic waves), that can be varied in such a way as to convey information. The signal 108 may comprise a portion of information, e.g., data, and a portion of noise. As used herein, the term "noise" when used to describe a signal refers to non-informational portions of a signal that may be introduced during, for example, capture, storage, transmission, processing, or conversion.

The system 100 may be configured for close range or long range communication between the device 102 and the signal 108. The term, "close range communication" is used herein to refer to systems and methods for wirelessly sending/receiving data signals between devices that are relatively close to one another. Close range communication includes, for example, communication between devices using a BLUETOOTH™ network, a personal area network (PAN), near field communication, ZigBee networks, an Wireless Display connections, millimeter wave communication, ultra-high frequency (UHF) communication, combinations thereof, and the like. Close range communication may therefore be understood as enabling direct communication between devices, without the need for intervening hardware/systems such as routers, cell towers, internet service providers, and the like. However, the system 100 is not necessarily limited in this regard. For instance, the signal 108 may be local, e.g., stored on a hard drive or other computer readable media, or otherwise acquired without using network communication.

In contrast, the term, "long range communication" is used herein to refer to systems and methods for wirelessly sending/receiving data signals between devices that are a significant distance away from one another. Long range communication includes, for example, communication between devices using WiFi, a wide area network (WAN) (including but not limited to a cell phone network, the Internet, a global positioning system (GPS), a whitespace network such as an IEEE 802.22 WRAN, combinations thereof and the like. Long range communication may therefore be understood as enabling communication between devices through the use of intervening hardware/systems such as routers, cell towers, whitespace towers, internet service providers, combinations thereof, and the like.

Figure 2:
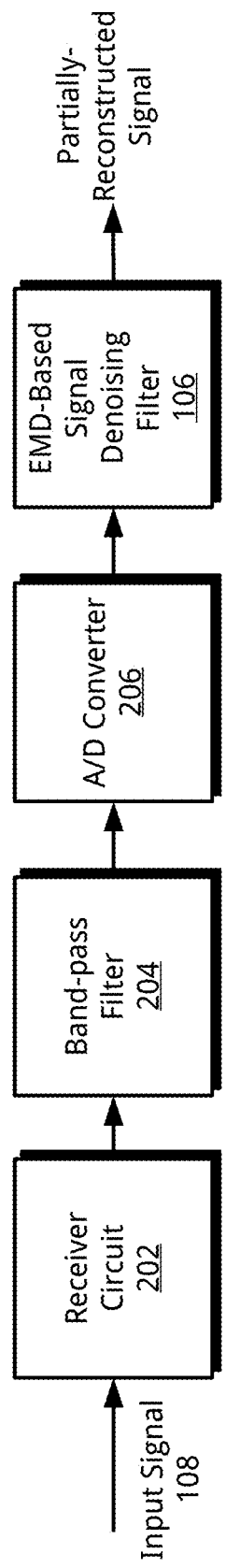
FIG. 2 is a block diagram illustrating various example signal processing stages of the system of FIG. 1 consistent with the present disclosure.

FIG. 2 is a block diagram of one embodiment 200 of the system 100 (FIG. 1) including various signal processing stages consistent with the present disclosure. The block diagram in FIG. 2 is shown in highly simplified form for ease of explanation. Note that while FIG. 2 depicts a system configured for wirelessly receiving signal 108, this disclosure is not limited in this regard. For instance, the system 100 may not necessarily include an antenna or another wireless communication device. The embodiment illustrated in FIG. 2 includes an optional receiver circuit 202 coupled to an EMD-based signal de-noising filter 106 consistent with the present disclosure. In general, the receiver circuit 202 receives an input signal, e.g. from optional antenna 110 (FIG. 1), and uses the EMD-Based signal de-noising filter 106 to provide a partially reconstructed signal. The partially reconstructed signal may include substantially only those signals that represent information. The partially reconstructed signal may be used in various other processes, e.g., voice processing, seismic monitoring, ECG analysis, and so on.

The optional receiver circuit 202 may be any suitable wireless signal receiver configuration for receiving an input signal 108 from the antenna 110 and providing an analog output signal representative of the received signal. An analog output of the receiver circuit 202 is coupled to the band-pass filter 204. The band-pass filter 204 may take a known configuration for receiving the analog output of the receiver 202 and passing only portion of the bandwidth, e.g., data representative of one channel, to the A/D converter 206. For example, if the receiver 202a is intended for use in a IEEE 802.22 WRAN, the band-pass filter 204 may be configured to pass only a portion of the analog signal within the dedicated TV band specified by IEEE 802.22. The A/D converter 206 may be configured to oversample (e.g. 10 times the highest frequency) the output band-pass filter 204 to provide a digital output representative of the output of the band-pass filter 204.

The digital output of the optional A/D converter 206 is coupled as an input to the EMD-based signal de-noising filter 106. The EMD-based signal de-noising filter 106 receives the digital output of the optional A/D converter 206 and reduces or otherwise eliminates noise by identifying relevant, e.g., information-carrying IMFs, from noise, e.g., noise-carrying IMFs. In some cases, the EMD-based signal de-noising filter 106 may receive a digital representation of a signal without the use of a A/D converter. After identification of the relevant IMFs, the EMD-based signal de-noising filter 106 may partially reconstruct the signal based on the identified relevant IMFs, and thus, may output a de-noised signal for use by subsequent additional processing stages (not shown). One such example process for EMD-based signal denoising is discussed further below with reference to FIGS. 5 and 6.

EMD-Based Signal De-Noising Architecture and Methodology

EMD is a non-linear decomposition process that may be utilized to analyze and represent non-stationary real world signals. In general, EMD decomposes a time series signal into the IMFs, which are simple harmonic functions, and are collected through an iterative process known as sifting. The iterative procedure eliminates most of the signal anomalies and makes the signal wave profile more symmetric. The frequency content embedded in the processed IMFs reflects the physical meaning of the underlying frequencies.

Figure 3:
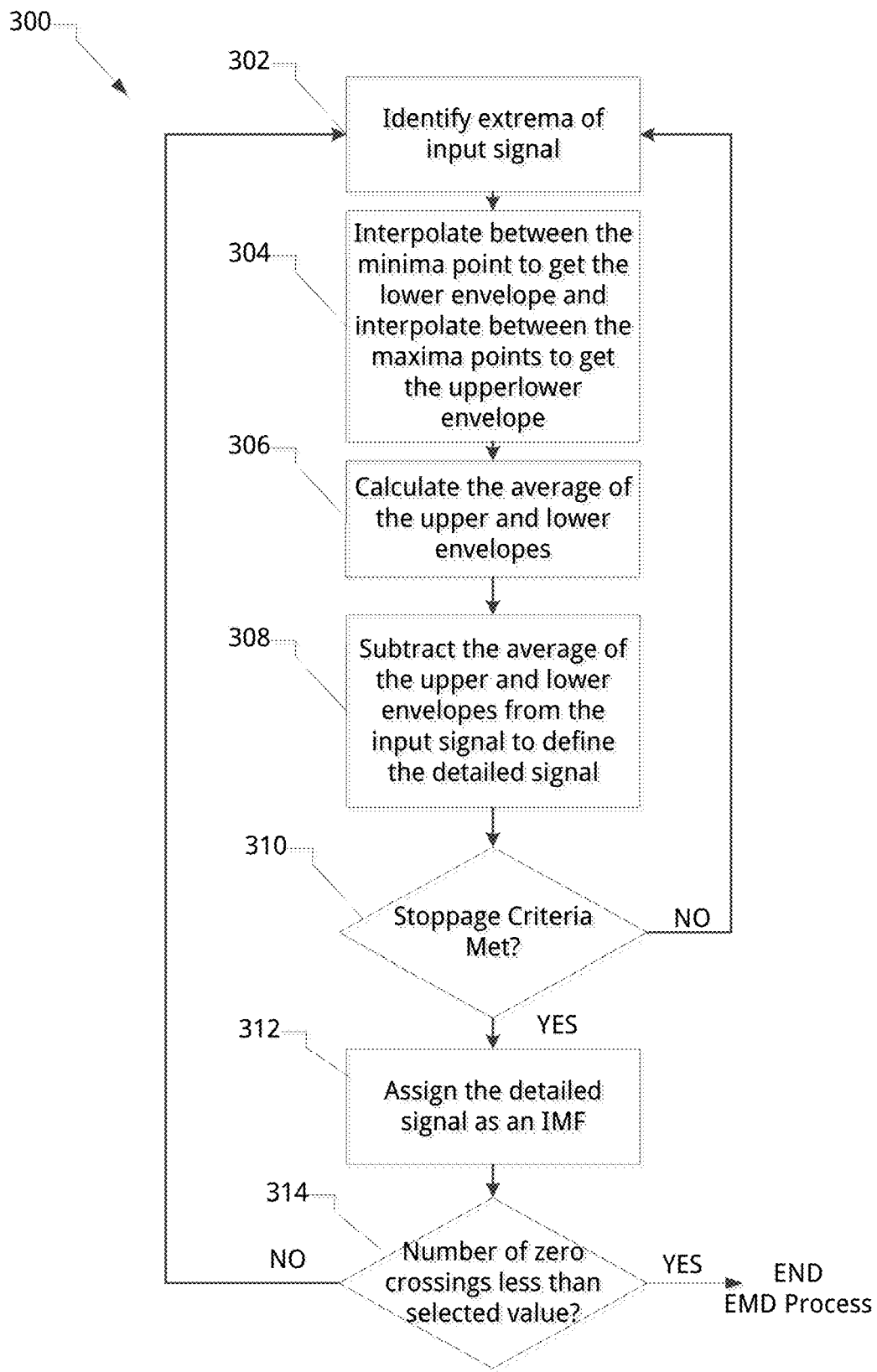
FIG. 3 is a flowchart illustrating operation of one example of an EMD process consistent with the present disclosure.

An EMD process may be implemented in a variety of ways. FIG. 3 is a flow chart illustrating one EMD process 300 useful in connection with a system and method consistent with the present disclosure. While flowcharts presented herein illustrate various operations according to example embodiments, it is to be understood that not all of the depicted operations are necessary for other embodiments. Indeed, it is fully contemplated herein that in other embodiments of the present disclosure, the depicted operations, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

In the illustrated embodiment, the EMD process may begin by identifying 302 all extrema of an input signal x(n), i.e. $x_{max}(n)$ and $x_{min}(n)$. An interpolation 304 between the minima points may be performed 304 to define a lower envelope or $e_{min}(t)$), and an interpolation between the maxima may be performed to define an upper envelope $e_{max}(t)$. The averages of the envelopes may then be calculated 306 as:

$$m(n) = \frac{(e_{max}(n) + e_{min}(n))}{2}$$ Equation (1)

The detailed signal may then be calculated 308 as: d(n)=x(n)−m(n). If the stoppage criteria has been satisfied, the detailed signal is an IMF. The detail d(n) may be assigned 310 as an IMF. If a stoppage criteria is not met 312, then additional IMFs may be calculated 314 by subtracting d(n) from the input signal to define a residue and assigning the residue as a new input signal and iterating the process. If the number of zero crossings is less than two, then the EMD process may end, 312 then the EMD process may end.

The stoppage criteria may be selected and/or applied in a number of ways to set the number of iterations in the EMD process. In one embodiment, the stoppage criteria may be selected to ensure that the difference between successive residue calculations is small. For example, a Cauchy convergence test may be used to determine whether the normalized squared difference between two successive residue calculations is less than a selected value, e.g. (0.2 or 0.3).

In one embodiment, after each iteration, if the detail d(n) satisfies the stoppage criteria, then the detail d(n) may be assigned as an IMF and the residue may be assigned as a new input signal. If a given an input signal x(t) in any iteration satisfies the stoppage criteria and the number of extrema and zero crossings differ by one, then the input signal may be assigned as an IMF and the EMD process may end. Also, in any iteration, if the number of zero crossings less than 2, then the EMD process may be ended and the last collected detail d(n) may be identified as the final IMF.

The original input signal may then be reconstructed based on the following equation:

$$\hat{y}(n) = \Sigma_{i=1}^{M} \text{IMF}_i(n) + \Re(n)$$ Equation (2)

where (n) is the sample index, ŷ(n) is the reconstructed signal, (M) is the total number of IMFs and $\mathfrak{R}$(n) is the residue "trend" of ŷ(n).

In an embodiment, the first IMFs identified by the iterative sifting process tend to substantially extract the noisy portions of a processed signal. For signals corrupted with noise, EMD may start by sifting the finer components (e.g., highest frequencies) which represents the noise content in the first, e.g., lowest-order, IMFs. The EMD sifting process may then be carried out based on the IMFs acting as overlapped bandpass filters in which the highest frequencies are filtered in the first modes, which may resemble the behavior of dyadic filter, for example. To this end, de-noising through EMD may be performed through identifying/selecting the information-carrying IMFs and discarding or otherwise ignoring the other IMFs (e.g., the noisy modes). However, distinguishing between an information-carrying IMF and a noise-carrying IMF is complicated by the data-driven nature of EMD. As discussed further below with reference to FIGS. 5, 6 and 21, various processes are disclosed herein for using null hypothesis testing to identify and discard noise-carrying IMFs.

Some aspects of the present disclosure may be better understood by way of contrast. Other approaches to EMD-based signal de-noising include examining the statistical characteristics of each IMF to determine whether a given IMF approximately follow a Gaussian distribution. In a simple sense, these approaches select the IMFs that contribute more noise than information, and use a reconstruction to produce a signal without, or at least substantially without, the noise. However, this disclosure has identified that such EMD-based signal de-noising schemes lack responsiveness as Gaussian distributions and Laplace Distributions are not necessarily a "best fit" for all noise-carrying IMF distributions as will be discussed in greater detail below. Thus the techniques disclosed herein outperform other EMD-based approaches, as will be discussed further below with regard to FIGS. 9-11. In particular, the techniques disclosed herein may de-noise a signal to result in a signal-to-noise ratio (SNR) that may be an order of magnitude greater than other EMD de-noising approaches.

In an embodiment, a generalized probability distribution function (PDF) is disclosed and may be used in conjunction with a null hypothesis test for de-noising purposes. As will now be discussed, the generalized PDF results in distributions for each IMF that does not necessarily closely follow or otherwise approximate a Gaussian or normal distribution. The first IMF is bimodal, and thus the filtering processes discussed below use the second and higher IMFs obtained by subtracting $IMF_1$ from the original signal y(n) to result in r(n). More specifically, the following filtering processes operate on the distribution of the envelope means and residue signals. Because of the particular noise within the signal, such as wGn noise, the distribution of the m(n) is an estimate of a Gaussian distribution processes, which follows a student-t distribution with K−1 degrees of freedom where K is the number of extrema.

Figure 4:
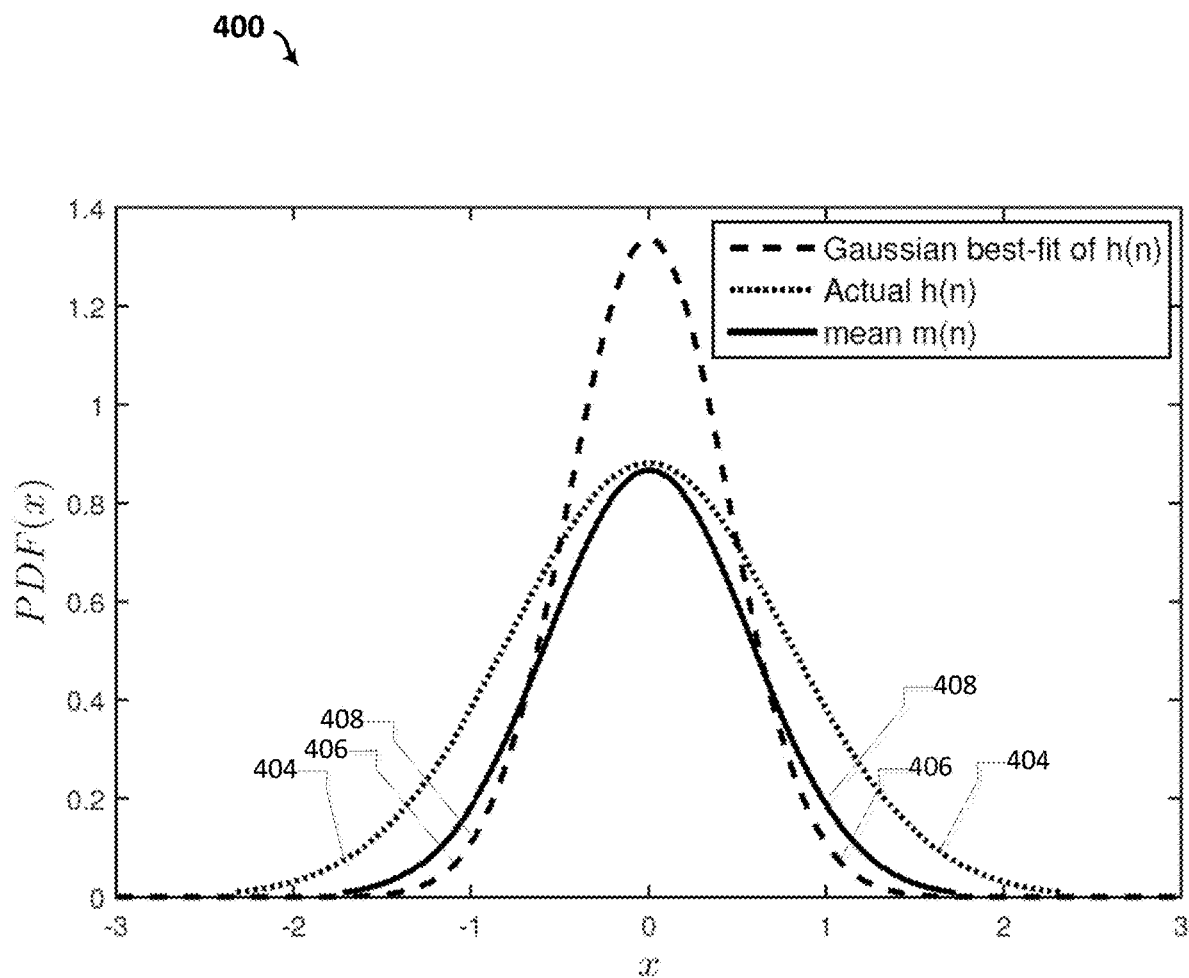
FIG. 4 shows a graph that plots distribution of components of the EMD sifting process compared to a best-fit distribution, in accordance with an embodiment of the present disclosure.

Now referring to FIG. 4, a plot shows the distribution of components of the EMD sifting process compared to a best-fit Gaussian distribution 406. As shown, the tails of the PDF of m(n) 408, and more importantly h(n) 404, which is the difference of r(n) and m(n), are heavier than a best-fit Gaussian distribution of h(n). The graph 400 of FIG. 4 demonstrates that IMFs having noise do not necessarily follow Gaussian (β=2) and Laplacian (β=1) distributions. Instead, aspects of the present disclosure have identified that resulting IMF distributions tend to be variant and dependent on signal type, sampling rate, and noise power, for example. Such variation is discussed in greater detail below with reference to FIGS. 12-22. Accordingly, the present disclosure has identified that IMFs with noise follow a generalized Gaussian Distribution (GGD) which includes a shape parameter (β). Because the distributions may be influenced by signal properties that can vary between iterations, β can be adjusted to account for these differences.

The probability distribution function (PDF) of a symmetric GGD may be defined by the following equations:

$$G(x) = \frac{\beta}{2\rho\Gamma\left(\frac{1}{\beta}\right)} e^{-\left(\frac{|x-\mu|}{\rho}\right)^\beta} \quad \text{Equation (3)}$$

$$\rho = \sqrt{\Gamma\left(\frac{1}{\beta}\right)/\Gamma\left(\frac{3}{\beta}\right)}\,\sigma \quad \text{Equation (4)}$$

where (β) is a parameter that controls the distribution tail, x is the input data signal samples, (μ) is the mean of the input data signal samples, (σ) is the standard deviation, and Γ(.) is a gamma function.

In accordance with an embodiment, a null hypothesis test is disclosed and may be evaluated for input processes with different PDFs contaminated with wGn and/or other noise. The distribution under test may first be transformed to Gaussian and then tested by a Gaussianity measure.

The cumulative distribution function (CDF) of the GGD based on the IMF samples, defined in equation 3, is given by:

$$F(x) = \frac{1}{2} + \text{sgn}(x-\mu)\frac{\hat{\gamma}\left[\frac{1}{\beta},\left(\frac{|x-\mu|}{\rho}\right)^\beta\right]}{2\Gamma\left(\frac{1}{\beta}\right)} \quad \text{Equation (5)}$$

where γ̂ denotes the lower incomplete gamma function, x is the input data signal samples, and μ is the mean of input data signal samples.

Two example methods for testing Gaussianity include Shapiro-Wilk test and the Shapiro-Francia test, although other Gaussianity tests are also within the scope of this disclosure. This disclosure has identified that the Shapiro-Wilk test is particularly well suited for platykurtic samples, whereas the Shapiro-Francia tests are particularly well suited for leptokurtic samples. Therefore, an initial kurtosis check may be applied on each IMF and then the best-performing Gaussian test may be performed. Both tests may return a single value, H, where the value of zero (0) indicates that the hypothesis is not rejected within the predefined confidence interval, and the value one (1) represents the hypothesis is rejected.

As the shape parameter (β) may be influenced by the input distribution, the null hypothesis test may evaluate the distribution as a function of β. Thus, the filtering processes disclosed herein propose searching over β values between 1 and 3, although other limits are within the scope of this disclosure. This disclosure has identified that the PDF of all IMFs for a wide-range of random signals may change from a Laplace distribution β=1 to a more round-top PDF. For a wide range of signal distributions and SNRs, the β value often remains less than 3. If x follows a GGD with β value of more than 3, then another distribution, e.g., Beta or generalized Gamma distribution, may serve as a better fit.

Figure 5:
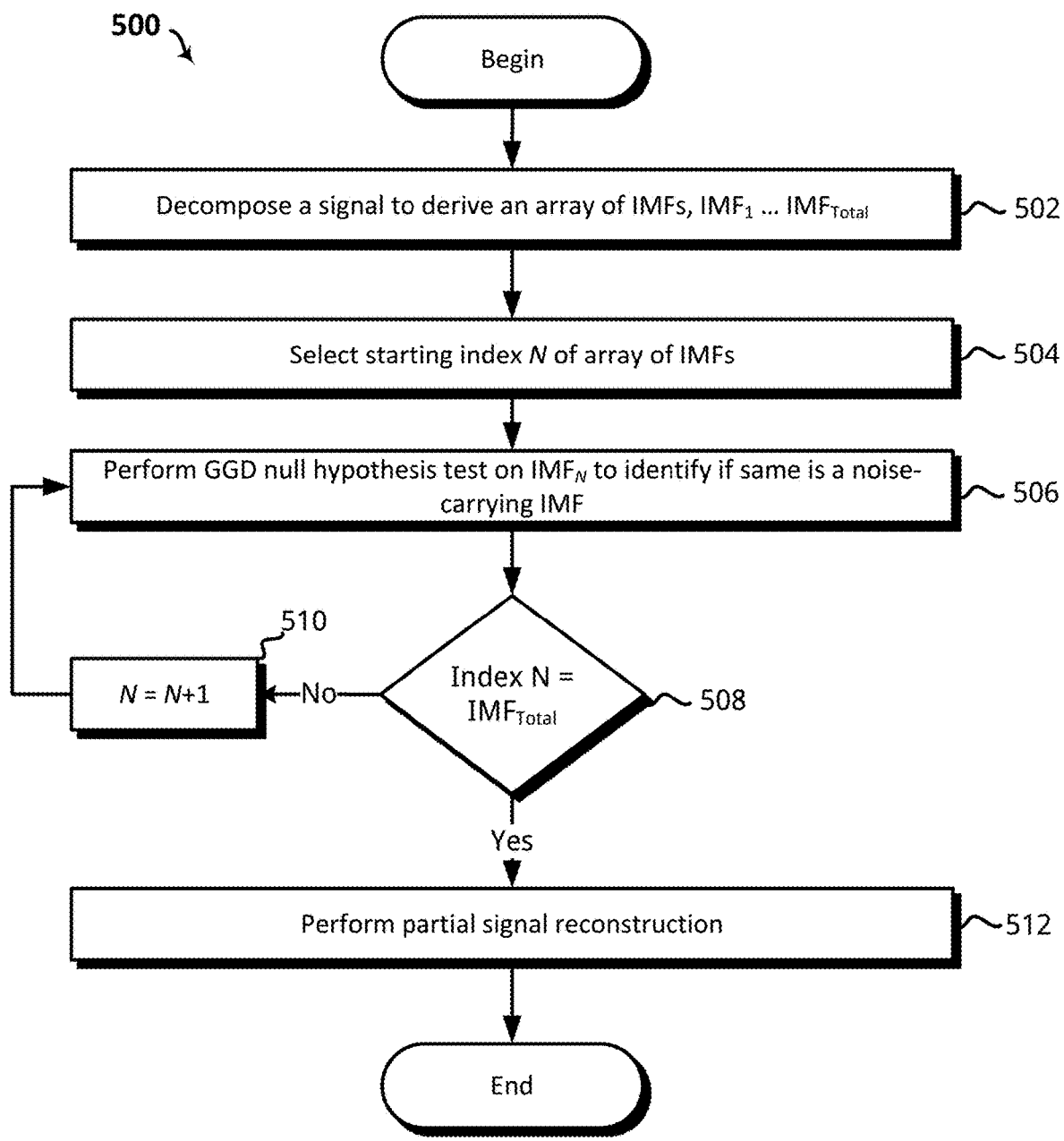
FIG. 5 is a flowchart illustrating operation of one example of an EMD-based signal de-noising process consistent with the present disclosure.

In view of the foregoing, FIG. 5 is a flow chart illustrating one EMD-based denoising process useful in connection with a system and method consistent with the present disclosure. The process 500 begins by decomposing 502 a signal to derive an ordered array of IMFs, e.g., $IMF_1$, $IMF_2$ . . . $IMF_{Total}$. Such decomposition may include utilizing the EMD process 300 of FIG. 3 to decompose a signal into associated IMFs, for instance, which will not be repeated for the purposes of brevity. However, other EMD processes may be utilized to generate IMFs and this disclosure is not particularly limited in this regard.

Process 500 may then continue by selecting 504 a starting index N of the array of IMFs derived in act 504. In some cases, the starting index N is 2. As previously discussed, the first index (e.g., $IMF_1$) may be bimodal and may be ignored to avoid a false positive during null hypothesis testing.

The process 500 may then continue by performing 506 a generalized Gaussian distribution (GGD) null hypothesis test on $IMF_N$ to identify if the same follows a distribution that corresponds to a substantially noisy IMF, which is to say a distribution that suggests a greater contribution of noise than signal. If the hypothesis succeeds, (H=0), the $IMF_N$ may be understood to represent a noise-carrying signal. On the other hand, if the hypothesis is rejected (H=1), the $IMF_N$ may be understood to represent an information-carrying signal, or at least an IMF having more contribution of signal than noise, and may be identified as the $IMF_R$. The process 500 may then continue with determining 508 if the present index N is equal to the total number of IMFs within the array of IMFs derived in act 502. If N is equal to the total number of IMFs within the array of IMFs, the process 500 continues to act 512. Otherwise, the process 500 continues to act 510.

The process 500 may then continue by incrementing 510 N (e.g., N=N+1) and the process 500 continues to perform acts 506 to 510 until each IMF has been analyzed via the null hypothesis test. In some cases, the process 500 may be abbreviated, i.e., ended without further null hypothesis tests of IMFs, when an information-carrying IMF is identified, and more specifically, the $IMF_R$ is identified. As previously discussed, noise signals tend to occupy low-order IMFs. Thus, in a general sense, the process 500 may determine that the first instance of an information-carrying IMF substantially marks/identifies the end of indices carrying noise and where the information-carrying IMFs begin. Accordingly, the process 500 may continue to act 512 once the first index of an information-carrying signal is identified, e.g., $IMF_R$.

The process 500 may then continue by performing 512 a partial signal reconstruction using the IMF indexes that were identified in act 508 as corresponding to information-carrying signals using Equation (2) discussed above, but modified in the following manner to begin summation at the $IMF_R$:

$$\hat{y}(n) = \sum_{i=R}^{M} IMF_i(n) + \Re(n) \qquad \text{Equation (6)}$$

where R is the index of the reference IMF ($IMF_R$). Thus, the process 500 may de-noise the signal, e.g., by removing one or more noise-contributing IMFs, to output a partially-reconstructed signal. The method 500 then ends in act 512.

Some aspects of partial signal reconstruction consistent with the process 500 may be better understood by example. Consider that the GGD null hypothesis test is evaluated for each IMF after a signal contaminated with wGn is processed by EMD. When H becomes 1, indicating that the hypothesis cannot be verified, the corresponding IMF (excluding $IMF_1$) may then be marked (or identified) as the reference IMF ($IMF_R$) and the same then becomes a starting point for partial signal reconstruction. In some cases, IMFs with an index higher than $IMF_R$ may follow the GGD, e.g., indicating noise. This may occur because IMFs with low amplitudes result in peaked PDFs and resemble Laplacian distribution, which is in the GGD family. Stated differently, if an IMF follows a GGD after the $IMF_R$, then that IMF may be added to the reconstructed signal as it is likely to be information-carrying. This is because at higher IMF indices the amplitudes of the low pass signal tend to get smaller, and hence it's PDF gets sharper (e.g., more peaked) stimulating the PDF of Laplacian distribution which is part of GGD family and thus its null hypothesis may be zero (H=0).

Referring to FIG. 8, one example, non-limiting null hypothesis test and β values for an electrocardiogram (ECG) input signal with various SNRs and a sampling rate of $f_s=8N_q$ (Nyquist) is shown. As shown, when the H-values equal zero (except for $IMF_1$) the β values range between 1 and 2 indicating that both Gaussian and Laplacian models may not be a proper selection. On the other hand, when the H-values become one, the β values may exceed 2 and thus may indicate signal presence. Further, increasing the SNR level results in shifting the IMFs with signal toward the lower-order IMFs due to the lower total noise power. The foregoing example was provided merely for illustration and is not intended to limit the present disclosure.

Figure 6:
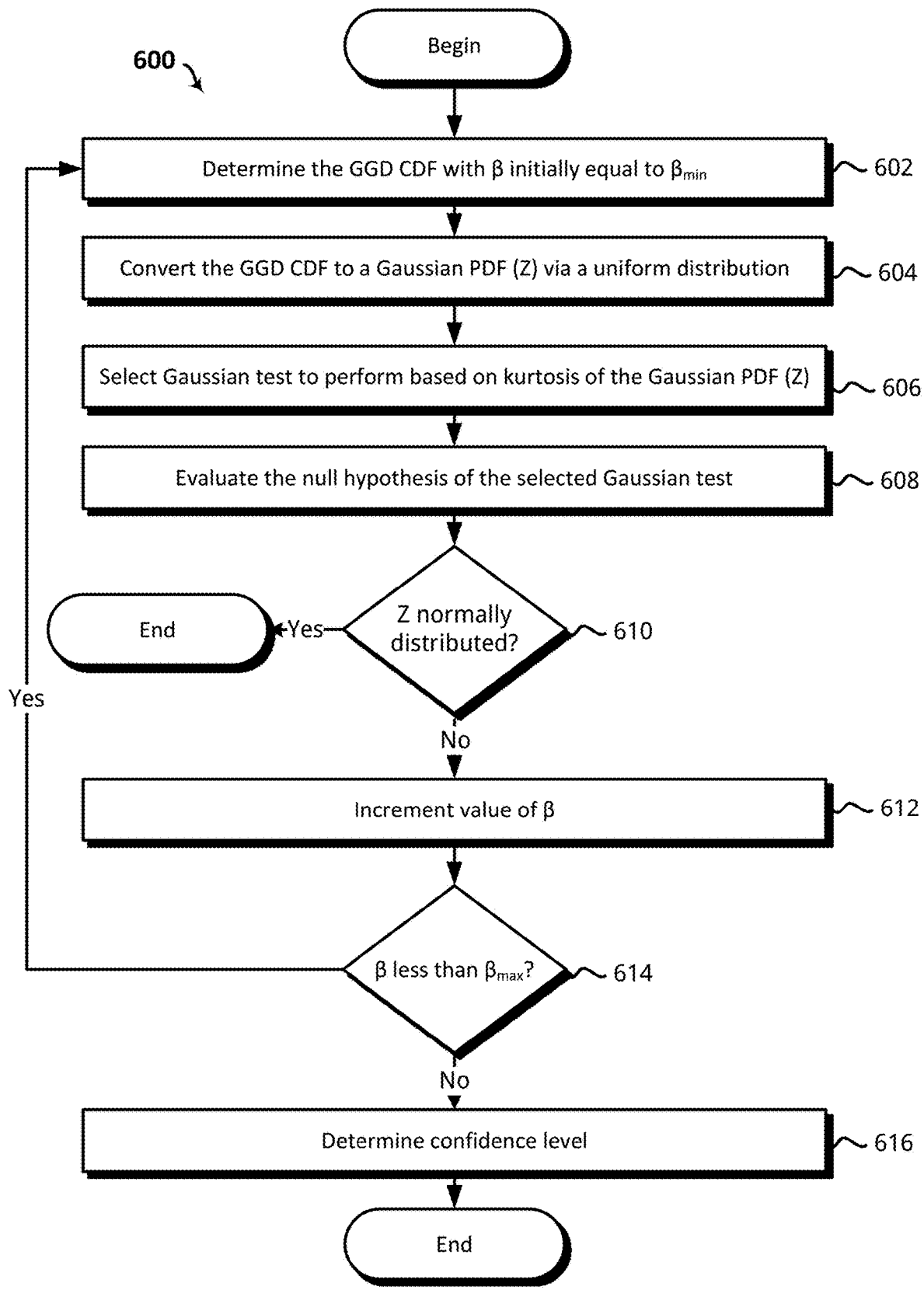
FIG. 6 is a flowchart illustrating an example generalized Gaussian distribution (GGD) null hypothesis test that is suitable for use within the EMD-based signal de-noising process of FIG. 5.

FIG. 6 shows one example process 600 useful for determining if a target IMF follows a GGD in accordance with an embodiment of the present disclosure. The example process 600 may suitable for using during, for instance, act 506 of the EMD-based de-noising process 500 discussed above. The process 600 begins by determining 602 the GGD CDF for the target IMF based at least in part on Equation (5) with β set equal to $β_{min}$. In an embodiment, $β_{min}$ is equal to about 1.0 (Laplace), although other minimum values are within the scope of this disclosure. The process 600 may then continue by converting 604 the determined GGD CDF to a Gaussian PDF (Z) via a Uniform distribution function. The process 600 may then continue by selecting 606 a Gaussian test, such as a Shapiro-Wilk or the Shapiro-Francia null hypothesis test, for example, based on the kurtosis of the distribution derived in act 604.

The process 600 may then continue by evaluating 608 the null hypothesis of the Gaussian test selected in act 606. If Z is normally distributed, then the samples (x) may follow a GGD with the given β, and thus may be considered a noise-carrying IMF (H=0). In this case, the process 600 may end. Otherwise, the process 600 may then continue by incrementing 612 the value of β by, for example, δβ=0.01, although other non-zero increments are also within the scope of this disclosure. For instance, a smaller step size (δβ) of 0.001 may increase accuracy but also increase processing time, while conversely a larger step size of 0.1 may reduce accuracy but decrease processing time. The particular value of the step size may therefore be chosen with the foregoing considerations in mind to optimize the process 600 to achieve a desired result.

Continuing on, and in act 614, if β is less than $β_{max}$, the process 600 returns to act 602 and acts 602-614 are repeated with the adjusted β value. In an embodiment, $β_{max}$ is equal to about 3.0, although other predefined maximum values are within the scope of this disclosure. On the other hand, if the process fails to reject the hypothesis (H=1) of x following GGD over all values of β up to $β_{max}$, the process continues to act 616. In this instance, the failure to reject the hypothesis may indicate the presence of an information-carrying signal, and thus, the position of $IMF_R$.

The process 600 may further include determining 616 the confidence level of the conclusion before stating this statistical rejection. The confidence level of α in the original Gaussian null hypothesis test may correspond to a probability of test failure of α. Thus, $$1-\alpha = \int_{-Z}^{Z} p(z) dz \quad \text{Equation (7)}$$

where Z is the interval limits. The transformation ensures that p(z)dz=p(u)du=p(x)dx the same value of α applies for x, but not necessarily the same interval limits as the PDF p(x) is not normal.

Turning to FIG. 7, table 700 shows example null Hypothesis (H) values for different input signal distributions 702 after performance of the process 600. The table 700 shows the null hypothesis test results for input signals of different distributions with Signal-To-Noise Ratio (SNR)=0 db and sampling rate ($f_s=8N_q$) where Nq is the Nyquist sampling frequency of the low-pass process ($N_q=2f_{max}$). The distributions 702, which range from the peaked (Laplacian) to flat top (Uniform), include an additive wGn (e.g., white noise), and decomposed via EMD using the process 500 discussed above with regard to FIG. 5. H=0 indicates that the corresponding IMFs follow the GGD and H=1 (excluding the first bimodal $IMF_1$) indicates that the corresponding IMFs do not follow GGD or the null hypothesis test failed to show the IMF follows the GGD.

Accordingly, the table 700 demonstrates that, for a range of input distributions, the null hypothesis test of the first, low-order IMFs follow a GGD distribution (H=0), which is attributable to the behavior of sifting during EMD that sifts the noise components into the first, low-order IMFs. In this sense, the higher order IMFs that do not follow GGD indicate the presence of an information-carrying signal component, and this property may be utilized for de-noising purposes as variously disclosed herein.

Example Signal Simulation Use Cases and Results

Three distribution models will now be compared with their corresponding null hypothesis test on a synthetic ECG signal to show the efficacy of EMD-based signal de-noising scheme variously disclosed herein in light of varying amounts and types of noise. The following examples compare the SNR after de-noising for different values of input SNR and sampling rates. In addition, the following examples contrast the EMD-based signal de-noising techniques variously disclosed herein with other approaches to signal de-noising on three different types of signals. The particular sampling rate used in the following examples is $8N_q$ and Monte Carlo simulations are carried out for all obtained results by averaging 1000 runs. However, the specific signal types, sampling rates, noise types (e.g., colored versus white noise) and other parameters discussed herein are not intended to limit the present disclosure.

Figures 9, 10:
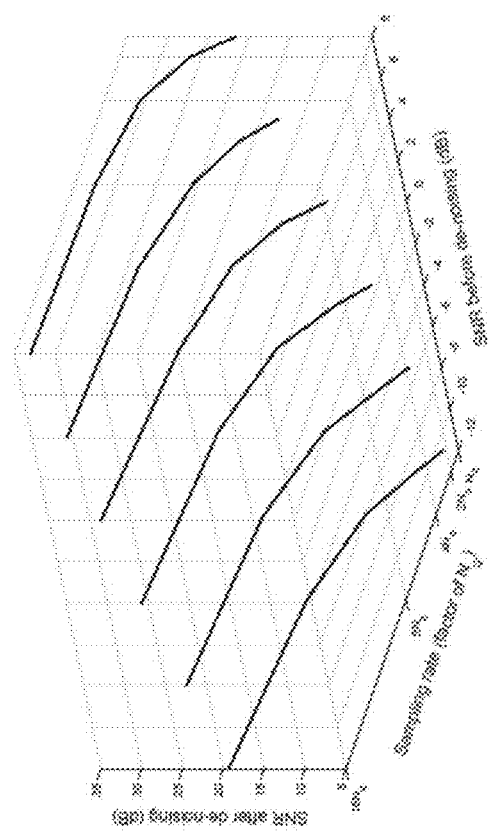
FIG. 9 is a table that provides a comparison of the SNR after de-noising and Mean Sequence Error (MSE) for three distribution models in a null hypothesis test for white and color noise over various SNR values, in accordance with an embodiment of the present disclosure.
FIG. 10 is a plot that shows the effect of sampling rate and SNR variation of generalized Gaussian distribution (GGD) model for an example electrocardiogram (ECG) signal, in accordance with an embodiment of the present disclosure.

The first example result shown in FIG. 9 is an analysis of the EMD-based signal de-noising scheme disclosed herein using GGD as the proposed distribution model compared to the null hypothesis tests using the Gaussian and Laplacian distributions. The corresponding signal of interest, e.g., signal 108, for this first example result is an electrocardiogram (ECG) signal contaminated with noise for various input SNRs. Unlike white noise, the spectral density of real noise is not flat and the samples are correlated. Therefore, the result includes colored noise to show performance under relatively realistic, real-world conditions in which positively correlated colored noise is generated. The output SNR or SNR after de-noising, $SNR_O$, and Mean Square Error (MSE), are used for the performance evaluations as these metrics demonstrate the relative improvement in SNR and difference from the original signal. As shown in FIG. 8, the results indicate that GGD performs substantially better than Gaussian and Laplacian, particularly at low SNR values (<4 dB) both in terms of MSE and $SNR_O$.

Next, the effects of varying the sampling rate and SNR levels on the quality of the received signal (in terms of $SNR_O$) is illustrated in FIG. 10. As shown, the $SNR_O$ is enhanced by increasing the sampling rate and increasing the input SNR levels.

Figure 11:
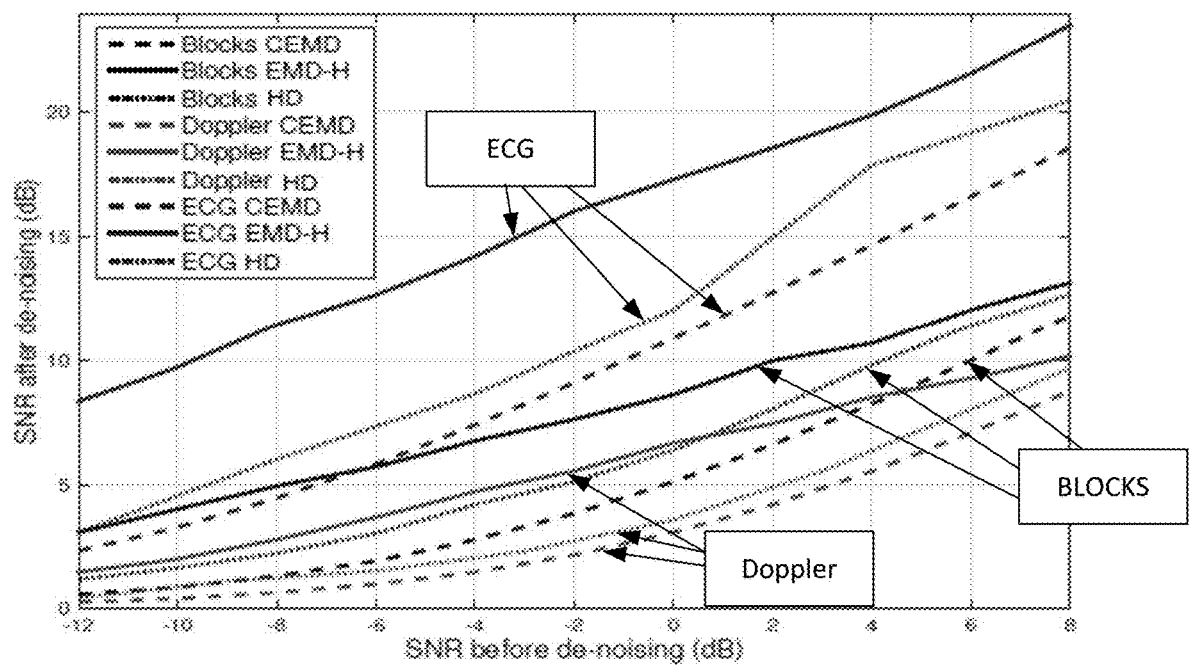
FIG. 11 is graph that plots an SNR comparison between an EMD-based signal de-noising scheme disclosed herein (EMD-H) and other EMD-based de-noising methods for various signals, in accordance with an embodiment of the present disclosure.

Turning to FIG. 11, results of a de-noising test is shown regarding an ECG signal and the Blocks and Doppler signals, which are contaminated by colored noise. The EMD-based signal de-noising method (EMD-H) disclosed herein is compared to other EMD-based de-noising techniques such as Conventional EMD (CEMD) and EMD-based Hausdorff distance (HD). As shown in FIG. 11, EMD-H out performs all of the other methods. Notably, at −10 dB, EMD-H has a gain of 1.5, 2.5, and 5 dB for the Doppler Blocks, and ECG signals over the best EMD-based peer. EMD-H also indicates improved de-noising performance relative to the other techniques due, at least in part, to the selection of the reference $IMF_R$, as discussed above with regard to FIG. 5.

As discussed above, performance of EMD on signals contaminated with noise, e.g., wGn, colored noise, and so on, yields Gaussian distributed IMFs (at least for the low IMF indices). However, non-Gaussian PDF input signals remain a relevant but largely unexplored signal type in the context of EMD processing for de-noising purposes. This disclosure has identified that signal de-noising processes consistent with the present disclosure may also be applicable to IMF probability distributions of different random variable PDFs both with and without noise, e.g., wGn.

As discussed in greater detail below, experiments were performed on PDFs with excess Kurtosis ranging from 3 to −1.2, which covers the PDFs between the most sharp (e.g., Laplacian) to the most flat top (Uniform). The experiments included analyzing seven (7) different distribution models (or distributions), namely, normal, uniform, Laplace, Logistic, Wigner, hyperbolic secant, and raised cosine. For each distribution, an average based on 100 signals (with 5000 samples per signal) were computed.

Figure 12:
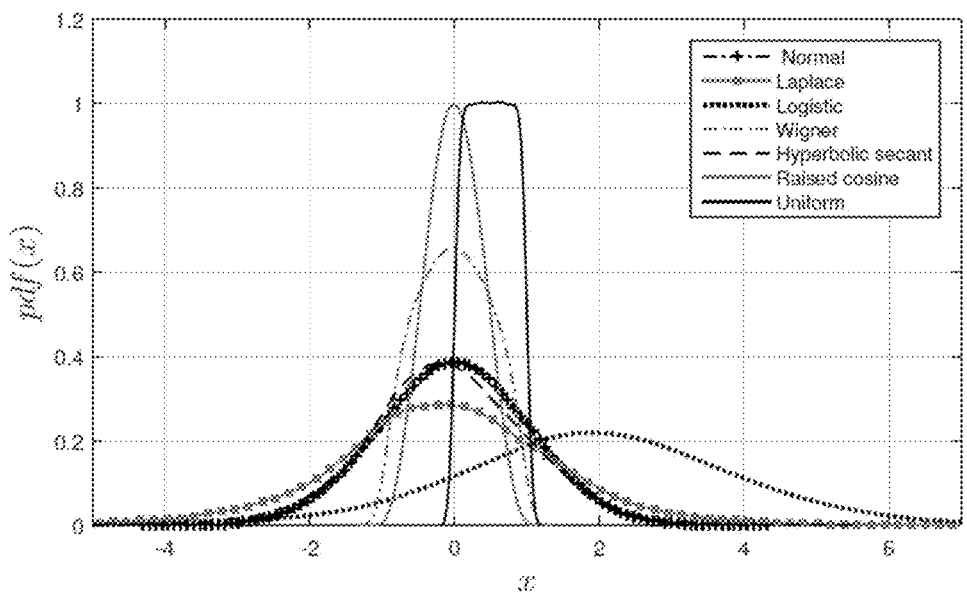
FIG. 12 is a graph that shows random variable PDFs for a plurality of input signal types in accordance with an embodiment of the present disclosure.
Figure 13:
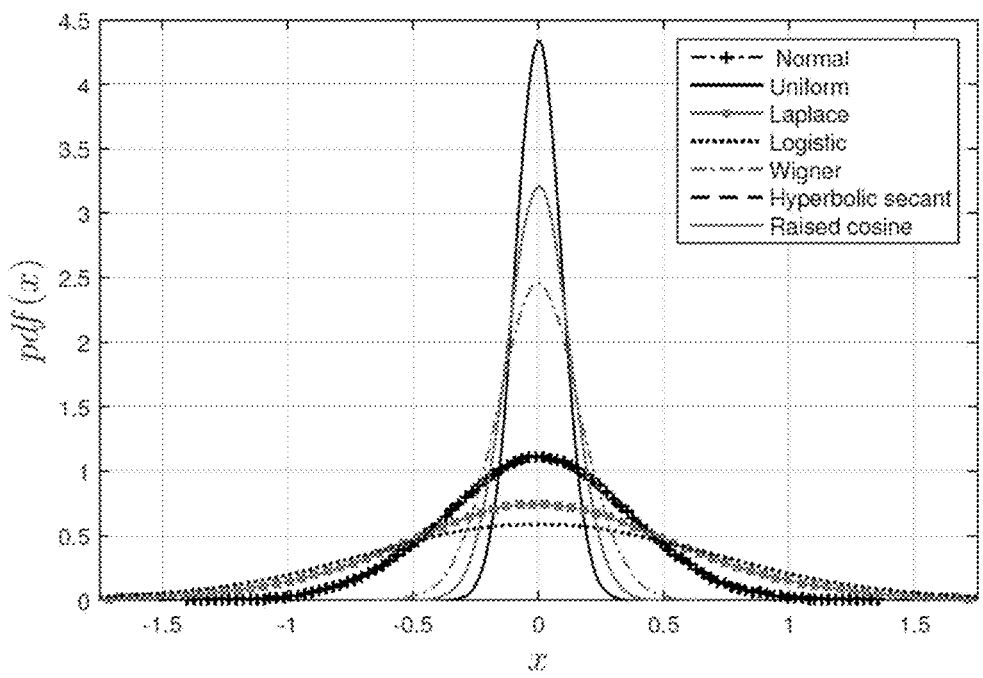
FIG. 13 is a graph showing the distribution of an IMF for each of the signal types shown within FIG. 12, in accordance with an embodiment of the present disclosure.

Turning to FIG. 12, a plot shows the associated random PDFs (which may also be referred to as random variables or simply variables) with the different statistic properties such as mean, variance, and kurtosis for each of the distribution types. EMD was applied on each of the random variables for the test signals shown in FIG. 12, and a set of IMFs were generated for each distribution in accordance with process 300 of FIG. 3. FIG. 13 illustrates an example of a particular IMF distribution ($IMF_3$) associated with each of the distributions shown in FIG. 12 without the addition of wGn. As can be seen in FIG. 13, each $IMF_3$ generally follows an "approximately" Gaussian distribution with zero-mean and different standard deviations.

Figure 14:
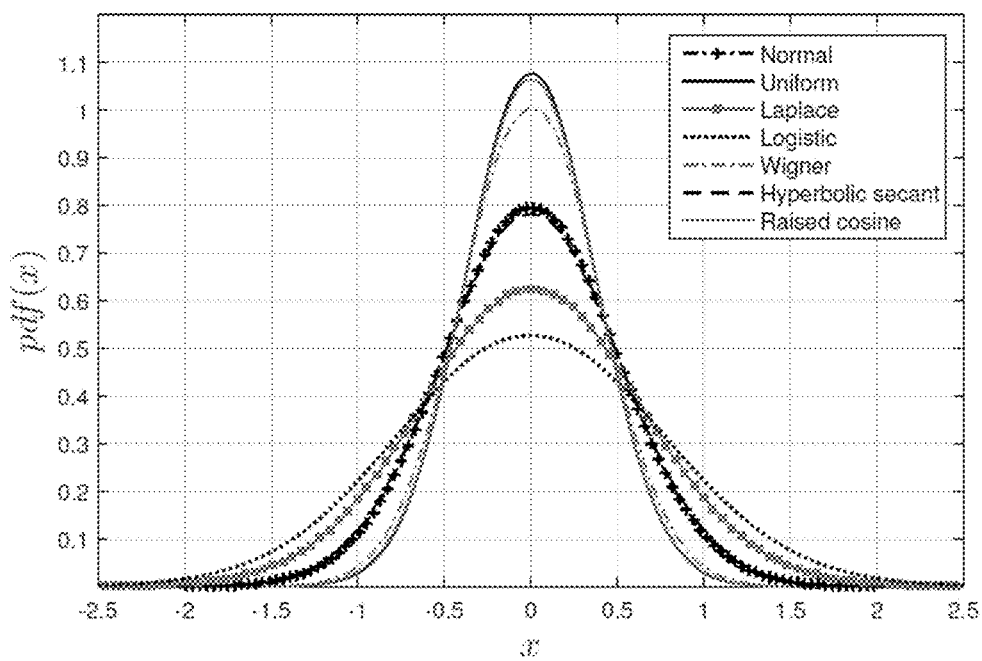
FIG. 14 is a graph showing the distribution of an IMF for each of the signal types shown within FIG. 12 when each is contaminated with white noise (wGn) in accordance with an embodiment of the present disclosure.

Similar conclusions are evident when the random variables of the test signals are contaminated with wGn as shown in FIG. 14. As previously discussed, this disclosure has identified that signals contaminated with noise, e.g., wGn, are understood to have a Gaussian-like shape.

Figure 15:
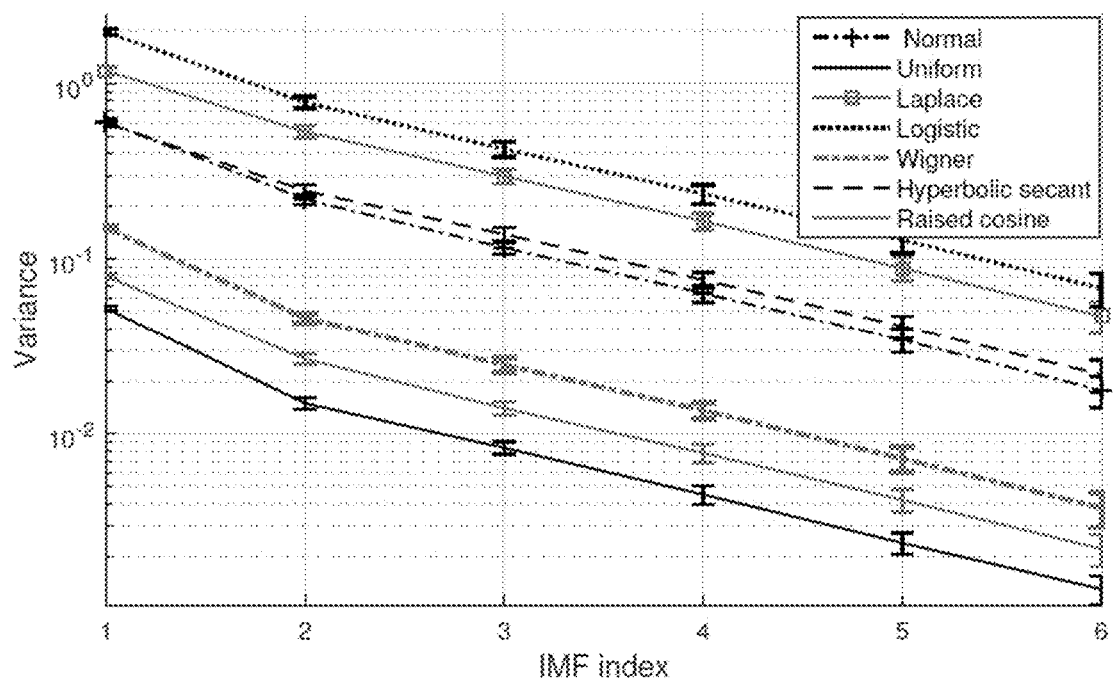
FIG. 15 shows the variance of different random PDFs for a plurality of signal types in accordance with an embodiment of the present disclosure.

Continuing on, the variance of the produced IMFs for each of the PDFs without added wGn is shown in FIG. 15. As shown, the variance decreases as the IMF indices increase. This is attributable at least in part to the iterative process (sifting) of EMD that lowers standard deviation of the distribution of one IMF during each iteration. Another way to understand this result is the stopping criteria used during EMD, e.g., Cauchy convergence, which shifts the IMF's PDFs from platykurtic to leptokurtic densities. Further, the Cauchy-based process (sifting) affects the tail weight of each IMF's PDF recursively, which results in smaller standard deviation (variance).

Figure 16:
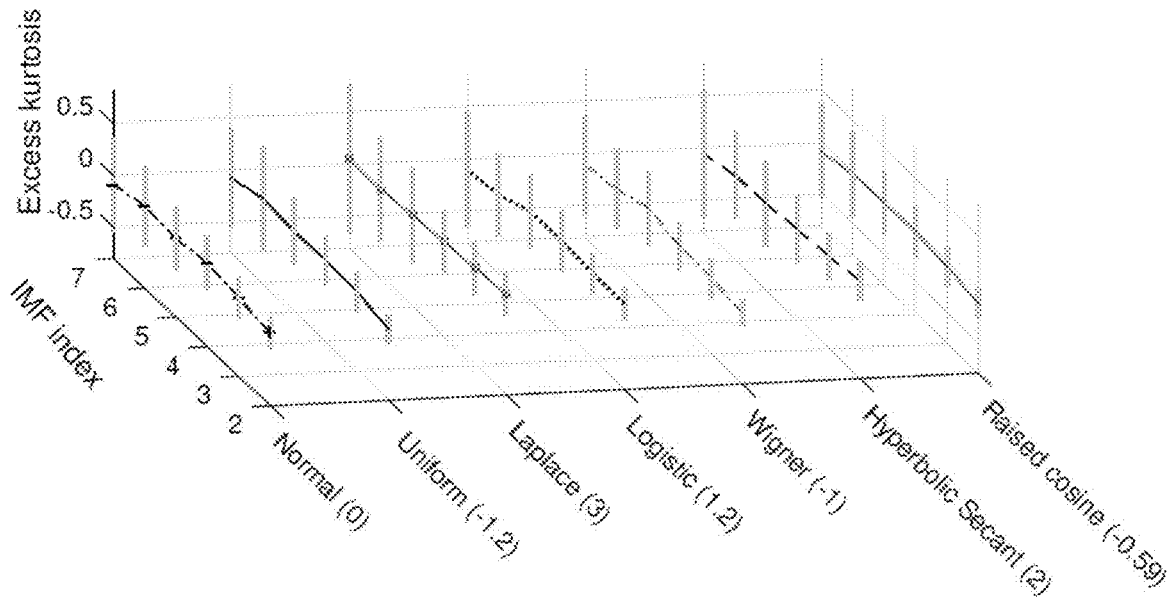
FIGS. 16 and 17 show excess kurtosis of various PDFs for a plurality of signal types when contaminated with and without wGn, in accordance with an embodiment of the present disclosure.
Figure 17:
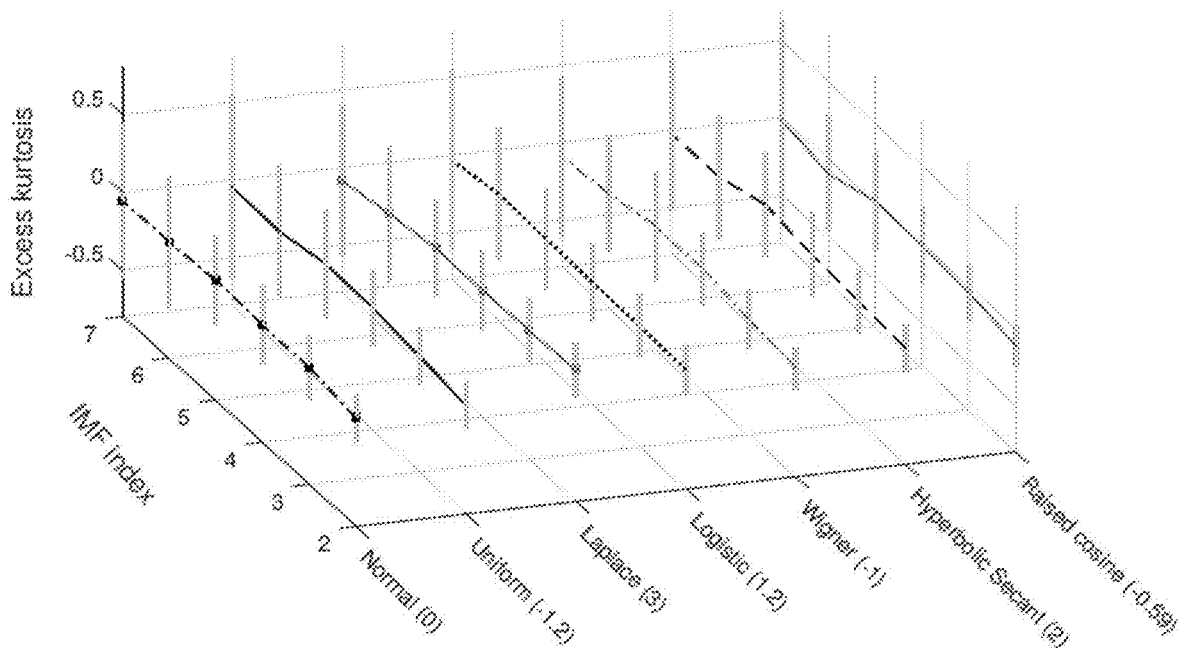

In any event, the excess kurtosis of the produced IMFs were represented for different PDFs with and without wGn as shown in FIGS. 16 and 17, respectively. As shown in FIGS. 16 and 17, the excess kurtosis is about 0 at low IMF indices, which indicates that the produced IMFs follow a generally Gaussian distribution regardless of the PDF of the input random variable of a given signal.

Based on the aforementioned results of IMFs statistic properties, it was concluded that, for different PDFs contaminated with or without wGN, the resulting IMF probability distributions will follow approximately Gaussian distribution. On the other hand, many of the IMFs have distributions that are skewed, have heavy tails, and/or are peaked. This suggests that under varying conditions the IMFs will follow a distribution other than Gaussian. As is known, some conditions lead to Gaussian distributed IMFs and in other cases Laplacian, but no analysis has exhaustively considered the distribution of IMFs across a wide range of input conditions. Therefore, experiments were conducted based on methodology discussed in greater detail below in order to verify what distributions a target signal may produce. Note that while seven (7) specific example distributions are referenced herein, the following methodology is not limited in this regard. For instance, additional distributions are also within the scope of this disclosure including distributions ranging from symmetric bell shape with non-finite support (e.g., Normal, Laplacian, Logistic, Hyperbolic secant, and raised cosine) to the symmetric with finite support (e.g., Acrsine, uniform, and Wigner), as well as asymmetric distributions (e.g., exponential, Gamma, Beta, and log-normal).

The following discussion details how the IMFs probability distribution may be derived based on analytical analysis of the EMD sifting process. Further, a statistical distance measurement is discussed further below to verify which particular probability has the "best fit" for a given input signal. Accordingly, EMD processing will now be briefly discussed for the purposes of clarity and for a point of reference for the analysis that follows. The following discussion is based on a Gaussian random variable with zero-mean and unity variance. Note, the analysis herein is directed to the second IMF, $IMF_2$, as the first IMF follows a bi-modal distribution.

The first iteration of $IMF_2$ starts by subtracting the mean $m_i(n)$ from $d_i(n)$ to yield $h_i(n)$, which is the $i^{th}$ sifted signal of $IMF_2(n)$, where i=1 ... S, S is the total number of sifting iterations for the $j^{th}$ IMF. Here, $m_i(n)$ is the mean of the upper and lower envelopes of the detailed signal $d_i(n)$ which can be defined as $d_i(n)=y(n)-IMF_1(n)$.

Figure 18:
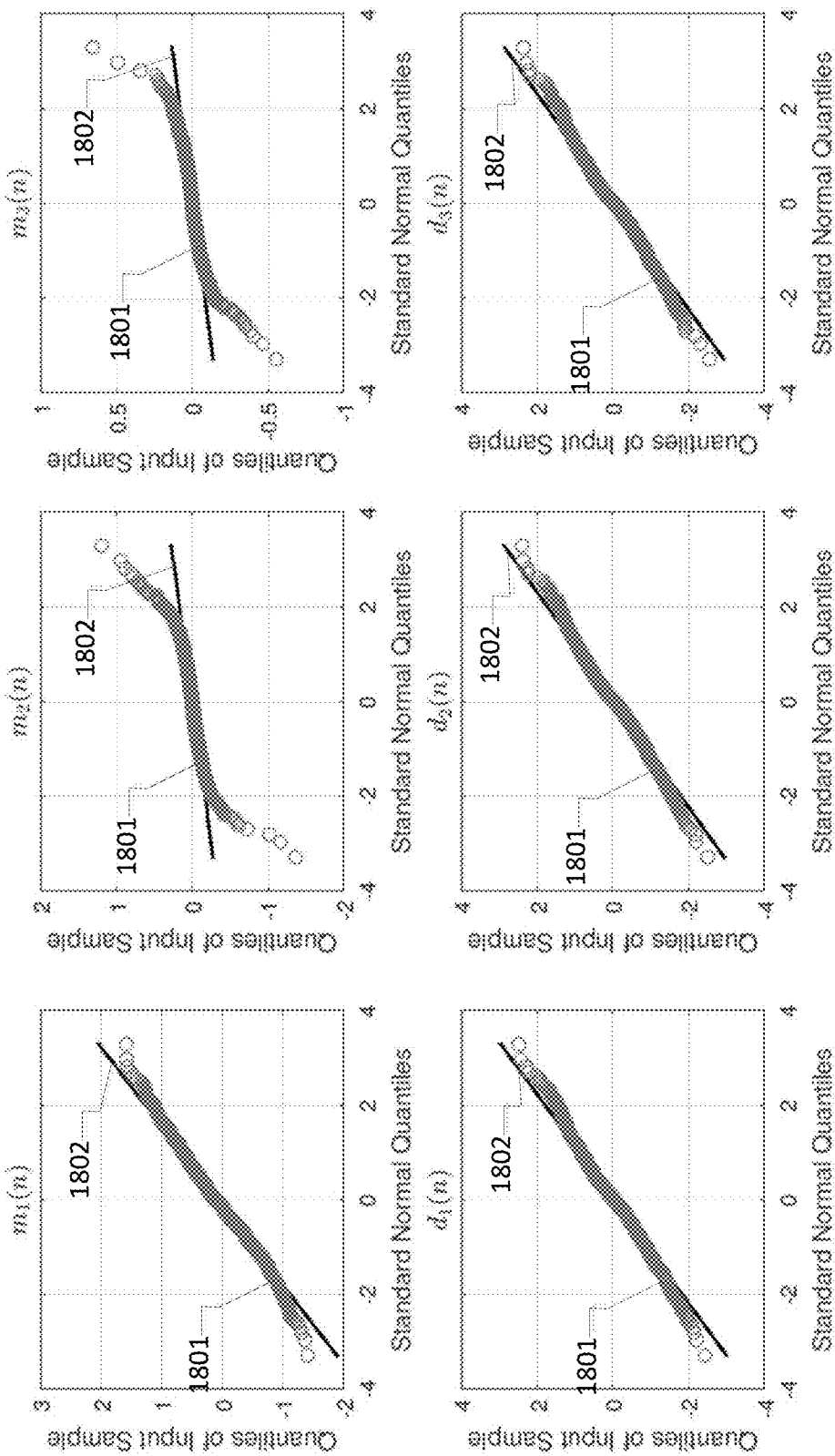
FIG. 18 shows the QQ plot of the envelope mean and detailed signal for three sifting iterations of an IMF, in accordance with an embodiment of the present disclosure.

To further understand how the EMD process affects the distribution of the IMFs, the distribution of the detailed signal $d_i(n)$ and mean of the envelopes $m_i(n)$ with a quantile plot were analyzed to assess the deviation from the theoretical normal distribution quantile. Thus, as shown in FIG. 18, sifting iterations result in the tail 1801 of the envelope becoming heavier, e.g., as indicated by grey circles, with reference to the standard normal distribution 1802, e.g., shown as a solid black line, as the IMF index increases due to the shift in data density from platykurtic to leptokurtic. On the other hand, the input signal exhibits tails that approach more to the Gaussian distribution over each iteration. The experimental results showed that the probability distribution of $m_i(n)$ and $d_i(n)$ follow student-t and Gaussian distributions respectively; this conclusion is supported by a best fit probability distribution simulation. For instance, different known distributions may be utilized to best fit the data, $m_i(n)$ and $d_i(n)$. Note, Bayesian information criterion (BIC) and Akaike information criterion (AIC) may be used to decide the fitting parameters that can model the underlying data in which a distribution that results in smallest the BIC or AIC is assumed the best fitting distribution. For simplicity, $m_i(n)$, $d_i(n)$ and $h_i(n)$ may also be referred to herein as $m_i$, $d_i$, and $h_i$, respectively.

As $m_i$ and $d_i$ are derived from the same random variable y(n), it was concluded that there is a possibility that $m_i$ and $d_i$ are statistically independent. Thus, the resulting $h_i$ is a copula convolution between $d_i$ and $m_1$. Therefore, the PDF of h may be given in terms of the joint probability distribution $fm_i, d_i$, by:

$$fh_i(h_i) \int_{-\infty}^{\infty} fm_i d_i(m_i, h_i + m_i) dm_i \qquad \text{Equation (8)}$$

If $d_i$ and $m_i$ are independent, then $fm_i, d_i(m_i,d_i)=fm_i(m_i)$ $fd_i(d_i)$ and the above integral becomes a convolution integral. On the other hand, the mean of $h_i$ is given by $\bar{h}_i=\bar{m}_i+\bar{d}_i$. The variance of $h_i$ is given by:

$$\sigma^2(h_i)=\sigma^2(m_i)+\sigma^2(d_i)+2\rho\sqrt{\sigma^2(m_i)\sigma^2(d_i)} \qquad \text{Equation (9)}$$

Where ρ is the correlation coefficient between the two variables. Simply stated, if the correlation coefficient, ρ, is non-negative (e.g., ≥0) then the variance of the resulting variable is more than the variance of either variables.

If $d_i$ and $m_i$ are assumed to be dependent variables, the multivariate cumulative distribution function $F(m_i,d_i)$ is thus equal to:

$$C(Fm_i(m_i), Fd_i(d_i)) \qquad \text{Equation (10)}$$

Where C is the copula, $Fm_i$ and Fd(di) are the cumulative marginal distributions of $m_i$ and $d_i$ respectively. In this respect, a statistical dependence measure, Kendall's tau (τ), is defined as:

$$\tau=4E[C(u,v)]-1 \qquad \text{Equation (11)}$$

Figure 19:
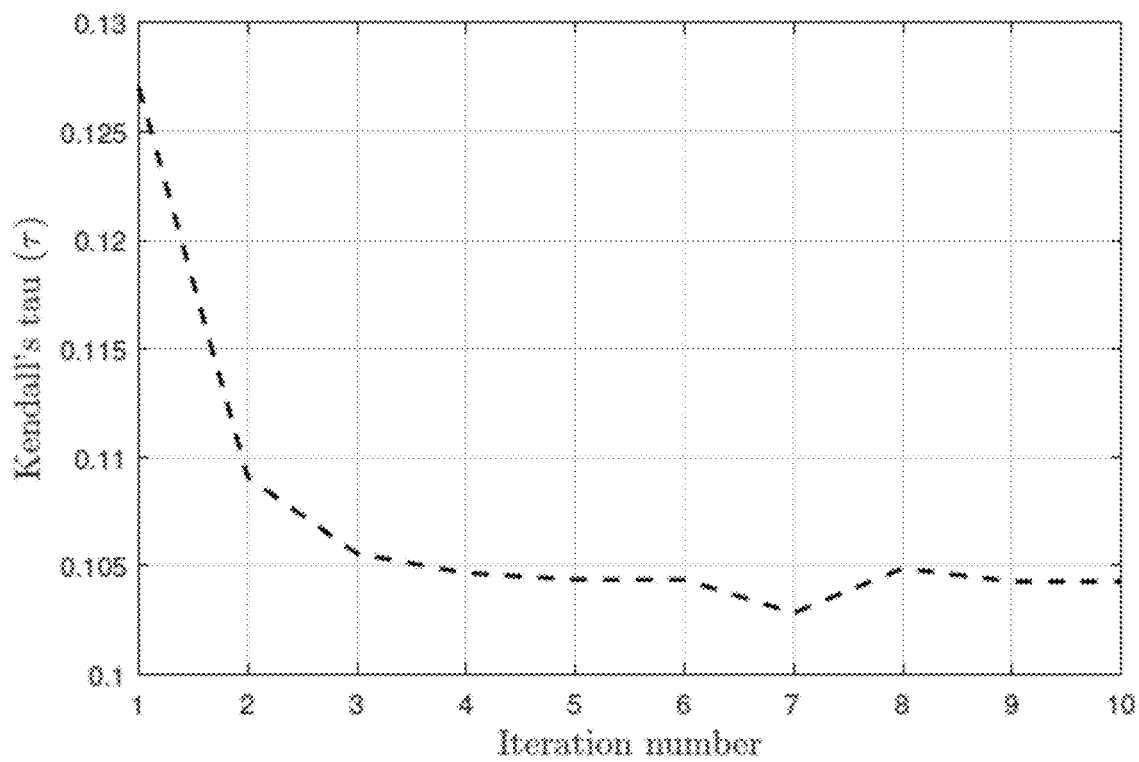
FIG. 19 is a graph showing the Kendall tau between the envelope mean and detailed signal for a plurality of sifting iterations of an IMF, in accordance with an embodiment of the present disclosure.

Thus, for independent variates with C(u,v)=uv, E[C(u, v)]=¼, thus τ=0. Also, for perfectly correlated variates, U=V, E[C (u, v)]=½, thus τ=1. Analysis of r for the different iterations of $IMF_2(n)$ show a very weak dependence between $m_i$ and $d_i$ that decreases as iterations proceed, which is shown in FIG. 19. Thus, convolution between the distributions of $m_i$ and $d_i$ can be used to estimate the distribution of $h_i$.

One general, closed-form expression for the convolution of student-t and Gaussian distribution is as follows:

$$f(s) = \frac{1}{\sqrt{2\pi} B\left(\frac{v}{2}, \frac{1}{2}\right)} e^{\left\{\frac{(s-\mu-m)^2}{2\sigma^2}\right\}} (-1)^c \sqrt{\pi} e^a \mathbb{D}_a^{-c} \left[a^{-1/2} e^{\left\{\frac{b^2}{4a}-a\right\}}\right] \qquad \text{Equation (12)}$$

Where v is the degrees of freedom, B(.,.) is the beta function, μ is the mean, σ is the standard deviation, $-\infty<m<\infty$, $\mathbb{D}_a^{-c}$ is the Grunwald Letnikov fractional derivative of order c, $$a = \frac{\lambda^2 v}{2\sigma^2}, b = \frac{\lambda \sqrt{v}(\mu + m - s)}{\sigma^2}, \text{ and } c = \frac{1+v}{2}.$$

However, Equation (12) has not been previously assigned to any known distribution. This disclosure has identified that one approach to using the closed-formed expression of Equation (12) when determining a best fit Gaussian distribution includes using the least squared error. The probability distribution function of a Gaussian distribution is given by:

$$g(x) = \frac{1}{\sqrt{2\pi}\,\sigma} e^{-\frac{(x-\mu)^2}{2\sigma^2}} \quad \text{Equation (13)}$$

Where $\mu$ and $\sigma$ are the mean and the standard deviation, respectively.

This disclosure has identified that replacing the shape parameter of the Gaussian distribution ($\beta=2$) by a variable creates a statistical family which is generally referred to herein as a Generalized Gaussian Distribution (GGD). This family includes the Laplacian and Gaussian distributions, $\beta=1$ and 2, respectively, but is not limited to only those distributions. Thus, the probability distribution function of a symmetric GGD may be given by Equation (3). GGD may also be utilized to model non-Gaussian processes, where distributions have tail weights heavier than Gaussian.

In order to show that GGD is a better "fit" than Gaussian with respect to the closed-form solution of Equation (12), the Hausdorff distance measure was calculated for the two distributions. The Hausdorff distance measure may be given by:

$$\mathcal{H}\mathcal{D}(A, B) = \max(\mathcal{D}(A, B), \mathcal{D}(B, A)) \quad \text{Equation (14)}$$

Where $(A, B) = \max_{a \in A} \min_{b \in B} \|a - b\|$ and $\mathcal{D}(B, A) = \max_{b \in B} \min_{a \in A} \|b - a\|$.

To calculate Hausdorff distance for comparison purposes, the PDF of the closed-form expression of Equation (12) may be substituted into Equation (14) as follows:

$\mathcal{H}\mathcal{D}(f(s),G(x)) = \max(\mathcal{D}(f(s),G(x)),$ $\mathcal{D}(G(x),f(s)))$ Equation(15)

Figure 20:
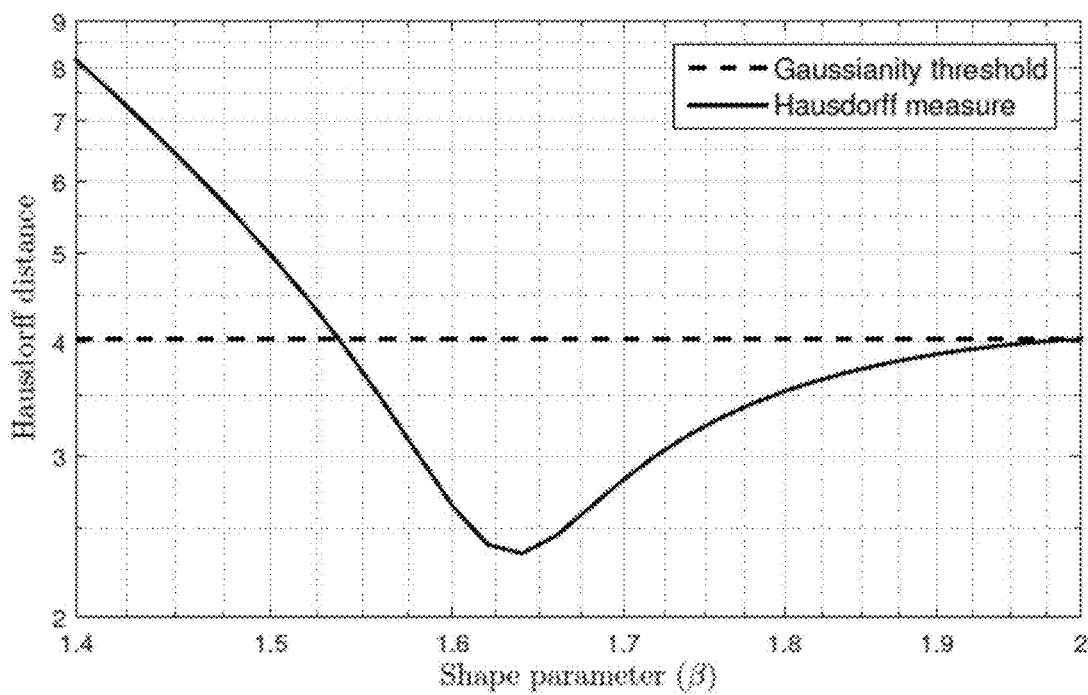
FIG. 20 is a graph showing the Hausdorff distance measure of an IMF relative to a Gaussianity threshold, in accordance with an embodiment of the present disclosure.

Using Equation (12), the two distributions were compared and the $\beta$ of GGD was varied between 1.4 and 2 to determine whether there was a distribution that reveals a better "fit" than a Gaussian distribution. As shown in FIG. 20, when $\beta=1.64$ (or thereabouts), the shortest distance or the highest similarity of GGD with respect to the closed-form expression of Equation (12) is obtained. Further it was noted that $\beta$ values in the region under the so-called "Gaussiantiy" threshold represent the closed-form expression more closely than the best fit Gaussian model.

The generalization of GGD includes platykurtic densities that span from the normal density ($\beta=1.64$) to the uniform density ($\beta=\infty$) and a leptokurtic densities that span from Laplace ($\beta=1$) to the normal density ($\beta=2$). Thus, the GGD has been identified as applicable across a wide range of PDFs, where Laplace and Gaussian distributions are simply special cases within the GGD family.

With the foregoing in mind, this disclosure has identified that EMD processing of Gaussian distributed random variables leads to a GGD. To verify the validity of this conclusion, a null hypothesis test using random variables with different pdfs including a Gaussian distribution was performed.

In order to apply a GGD null hypothesis test, and in accordance with an embodiment, the given distribution must be transformed first to Gaussian. In this respect, there are different normality tests in which the Shapiro-Wilk parametric hypothesis test of composite normality is used widely. Experimental performance results found that the Shapiro-Wilk was preferred for Platykurtic samples while the Shapiro-Francia test was preferred for Leptokurtic samples. Therefore, an initial kurtosis check on the samples may be performed before a method is selected to perform Gaussianity. In either event, both tests can return a single value (H) where the value of zero indicates that the hypothesis is not rejected within the predefined confidence interval ($\propto$), and the value of one (1) represents that the hypothesis is rejected.

Continuing on, to apply the null hypothesis of GGD, the given random variable may be transformed to the cumulative distribution function (CDF) of the GGD. In the event the data samples follow a GGD, then this will cause the distribution of the random variable to become uniform. The CDF for the GGD may be given by, for example, Equation (5) as discussed above.

In view of the foregoing, experimental results were produced based on searching for GGD of $\beta$ between 1 and 3 since this disclosure has identified that the PDF of all IMFs for any random signal will change from Laplace distribution $\beta=1$ in the extreme case to a more round top PDF.

Figure 21:
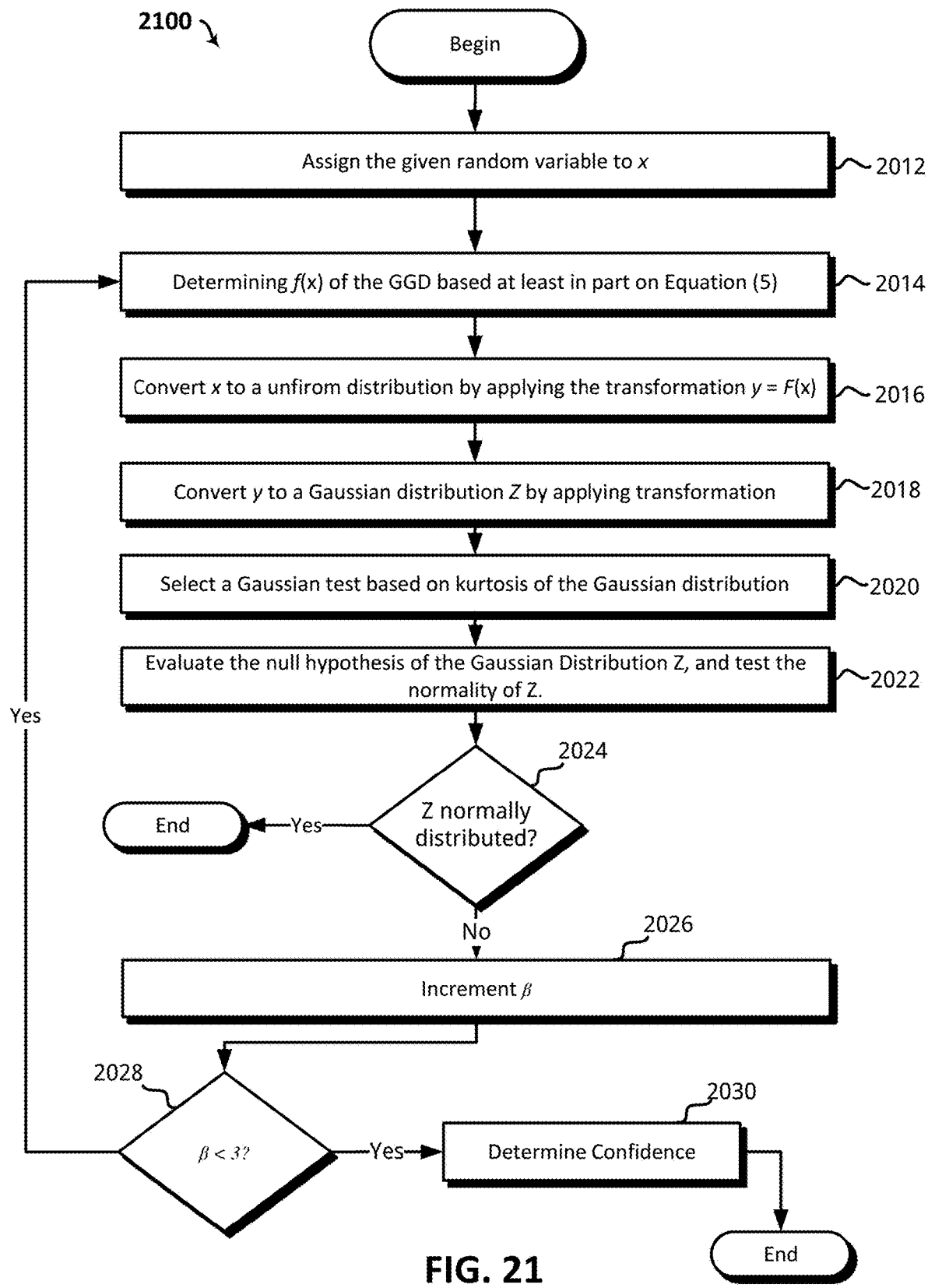
FIG. 21 shows an example process for determining if a random variable PDF follows a generalized Gaussian distribution, in accordance with an embodiment of the present disclosure.

One example process 2100 useful for determining if a random variable follows GGD is shown in FIG. 21. The process 2100 begins with assigning 2012 the given random variable to x. Then, process 2100 includes determining 2014 $f(x)$ of the GGD based at least in part on Equation (5) and a predefined $\beta$. In some cases, $\beta$ may be initially set to one (1) or any other suitable initial $\beta$ value.

The process 2100 may then include converting 2016 x to a uniform distribution by applying the transformation $y=F(x)$. In this case, if x follows GGD with the predefined $\beta$ then y may be uniformly distributed between 0 and 1.

The process 2100 may then continue by converting 2018 y to a Gaussian distribution by applying the transformation $Z = \text{er } f^{-1}(2y-1)$ where er $f$ and er $f^{-1}$ is the error function and the inverse error function respectively. At this stage, if y is uniformly distributed between 0 and 1, then Z will follow Gaussian distribution.

The process 2100 may then include selecting 2020 a Gaussian test based on kurtosis of the of the Gaussian distribution Z. In an embodiment, a Shapiro-Wilk or Shiparo-Francia null hypothesis test may be selected based on the associated kurtosis, although other Gaussian tests are within the scope of this disclosure.

The process 2100 may then include evaluating 2022 the null hypothesis of Gaussian distribution Z and test the normality of Z based on the test selected in act 2020. If Z is normally distributed 2024 then y is uniformly distributed between 0 and 1. Therefore, x follows GGD with the given $\beta$ and the process 2100 then ends. Otherwise, the process 2100 may then include incrementing 2026 $\beta$ by a predefined value, e.g., 0.01 or other suitable step increment. The process 2100 may then continue to act 2028. In act 2028, $\beta$ is less than 3, the process continues to act 2014. Otherwise, the process 2100 continues to act 2030. The process 2100 may then include determining 2030 a confidence level of the conclusion. The confidence level of (a) in the original null hypothesis test would mean that the hypothesis of y not being uniformly distributed failed with a confidence level of 0.5er $f(\alpha)$. Further, this would mean that, the hypothesis that x did not follow GGD failed with a confidence level of $k[\Gamma_{inc}^{-1}(0.5er\ f(\alpha)]^{1/\beta}$ wherein $\Gamma_{inc}^{-1}$ is the inverse incomplete Gamm function and $$k = \sqrt{\Gamma\left(\frac{1}{\beta}\right)/\Gamma\left(\frac{3}{\beta}\right)}.$$

Turning to FIG. 22, a table illustrates null hypothesis tests for different random variable PDFs with 5000 samples. As shown, H=0 indicates that the corresponding IMFs follow GGD. On the other hand, H=1 (excluding $IMF_1$) indicates that the corresponding IMFs do not follow GGD. On the other hand, the corresponding values demonstrate that GGD distribution may fit the resulting IMFs other than Gaussian or Laplacian distributions.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuit" or "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used herein, use of the term "nominal" or "nominally" when referring to an amount means a designated or theoretical amount that may vary from the actual amount.

FURTHER EXAMPLE EMBODIMENTS

In accordance with an aspect of the present disclosure a system is disclosed. The system comprising a controller comprising an empirical mode decomposition (EMD)-based filtering stage configured to apply an EMD process to a signal to derive a plurality of Intrinsic Mode Functions (IMFs), identify at least one information-carrying IMF of the plurality of derived IMFs that contributes more signal than noise; and generate a partially-reconstructed signal based, at least in part, on the at least one identified information-carrying IMF, wherein the EMD-based filtering stage is further configured to identify the at least one information-carrying IMF based at least in part on a generalized probability distribution function (PDF).

In accordance with an aspect of the present disclosure a method for de-noising a signal is disclosed. The method comprising decomposing the signal to derive an array of intrinsic mode functions (IMFs) using an Empirical Mode Decomposition (EMD) process, identifying a reference IMF index based on a generalized Gaussian distribution (GGD) null hypothesis test, the reference IMF index corresponding to a lowest-order information-carrying IMF of the array of IMFs, and generating a partially-reconstructed signal based at least in part on the identified reference IMF index.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:
1. A system comprising:
 a controller comprising an empirical mode decomposition (EMD)-based filtering stage configured to:
  apply an EMD process to a signal to derive a plurality of Intrinsic Mode Functions (IMFs);
  identify at least one information-carrying IMF of the plurality of derived IMFs that contributes more of an information signal than noise;

identify at least one noise-carrying IMF of the plurality of derived IMFs that contributes more noise than information signal;

output a de-noised signal by generating a partially-reconstructed signal based, at least in part, on the at least one identified information-carrying IMF; and wherein the EMD-based filtering stage is further configured to identify the at least one information-carrying IMF by comparing a probability distribution of the at least one information-carrying IMF to a generalized Gaussian distribution (GGD), and wherein the probability distribution of the at least one information-carrying IMF has a shape that does not follow a corresponding shape of the GGD; and wherein the EMD-based filtering stage is further configured to identify the at least one noise-carrying IMF based at least in part on comparing a probability distribution of the at least one noise-carrying IMF to the GGD, wherein the probability distribution of the at least one noise-carrying IMF has a shape that follows the corresponding shape of the GGD.

2. The system of claim 1, wherein a probability distribution function of the GGD is provided by an equation defined as:

$$G(x) = \frac{\beta}{2\rho\Gamma\left(\frac{1}{\beta}\right)} e^{-\left(\frac{|x-\mu|}{\rho}\right)^\beta}$$

where ($\beta$) is a parameter that controls a distribution tail, (x) is input data signal samples, ($\mu$) is a mean of the input data signal samples, and $\Gamma(.)$ is a gamma function, and ($\rho$ is an equation defined as:

$$\rho = \sqrt{\Gamma\left(\frac{1}{\beta}\right) / \Gamma\left(\frac{3}{\beta}\right)} \sigma .$$

Where ($\sigma$) is the standard deviation.

3. The system of claim 1, wherein the EMD-based filtering stage is further configured to perform a generalized Gaussian distribution (GGD) null hypothesis test on two or more of the IMFs of the plurality of IMFs to identify the at least one information-carrying IMF.

4. The system of claim 3, wherein the GGD null hypothesis test is configured to:

derive a first generalized Gaussian distribution (GGD) cumulative distribution function (CDF) with a shape parameter ($\beta$) equal to a minimum shape value ($\beta_{min}$) for a target IMF of the plurality of IMFs;

convert the first GGD CDF to a first Gaussian PDF (Z) via a uniform distribution;

select a Gaussian test to perform based on kurtosis of the first Gaussian PDF (Z); and evaluate a null hypothesis of the first Gaussian PDF (Z) based on the selected Gaussian test, and in response to the first Gaussian PDF (Z) being normally distributed, identifying the target IMF as the at least one noise-carrying IMF.

5. The system of claim 4, wherein the GGD null hypothesis test is further configured to adjust the shape parameter ($\beta$) by a step size ($\delta\beta$) from the minimum shape value $\beta_{min}$ up to a maximum shape value $\beta_{max}$ in response to the first Gaussian PDF (Z) not being normally distributed.

6. The system of claim 5, wherein the step size ($\delta\beta$) is at least 0.001, and wherein the GGD null hypothesis test is further configured to:

derive a second generalized Gaussian distribution (GGD) cumulative distribution function (CDF) with the adjusted shape parameter ($\beta$) for the target IMF of the plurality of IMFs;

convert the second GGD CDF to a second Gaussian PDF (Z) via a uniform distribution;

select a Gaussian test to perform based on the kurtosis of the second Gaussian PDF (Z); and evaluate a null hypothesis of the second Gaussian PDF (Z) based on the selected Gaussian test, and in response to the second Gaussian PDF (Z) being normally distributed, identifying the target IMF as the at least one noise-carrying IMF.

7. The system of claim 5, wherein the minimum shape value $\beta_{min}$ is equal to 1.0 and the maximum shape value $\beta_{max}$ is equal to 3.0.

8. The system of claim 5, wherein the GGD null hypothesis test identifies the target IMF as the at least one information-carrying IMF in response to the shape parameter ($\beta$) being set equal to or greater than the maximum shape value $\beta_{max}$.

9. The system of claim 4, wherein the GGD CDF is derived from an equation defined as:

$$F(x) = \frac{1}{2} + \operatorname{sgn}(x - \mu) \frac{\hat{\gamma}\left[\frac{1}{\beta}, \left(\frac{|x-\mu|}{\rho}\right)^\beta\right]}{2\Gamma\left(\frac{1}{\beta}\right)}$$

where ($\beta$) is a parameter that controls a distribution tail, $\Gamma(.)$ is a gamma function, ($\hat{\gamma}$) denotes a lower incomplete gamma function, (x) is input data signal samples, and ($\mu$) is a mean of the input data signal samples.

10. The system of claim 4, wherein the Gaussian test comprises a Shapiro-Wilk or a Shapiro-Francia test.

11. The system of claim 1, wherein plurality of IMFs comprise an ordered array of IMFs and the at least one identified information-carrying IMF is associated with an index value within the ordered array of IMFs, and wherein the EMD-based filtering stage is further configured to generate the partially-reconstructed signal based at least in part on an equation defined as:

$$\hat{y}(n) = \sum_{i=R}^{M} IMF_i(n) + \Re(n)$$

where (n) is a sample index, $\hat{y}(n)$ is a reconstructed signal, (M) is the total number of IMFs, $\Re(n)$ is a residue "trend" of $\hat{y}(n)$, and (R) is the index value associated with the identified information-carrying IMF.

12. A method for de-noising a signal, the method comprising:

decomposing the signal to derive an array of intrinsic mode functions (IMFs) using an Empirical Mode Decomposition (EMD) process;

identifying a reference IMF index based on a generalized Gaussian distribution (GGD) null hypothesis test, the reference IMF index corresponding to a lowest-order information-carrying IMF of the array of IMFs; and identifying a noise-carrying IMF of the array of IMFs that contributes more noise than information signal;

outputting a de-noised signal by generating a partially-reconstructed signal based at least in part on the identified reference IMF index; and wherein the identifying the reference IMF index based on the GGD null hypothesis test includes comparing a probability distribution of the lowest-order information-carrying IMF to a GGD, and wherein the probability distribution of the lowest-order information-carrying IMF has a shape that does not follow a corresponding shape of the GGD;

wherein identifying the noise-carrying IMF is based at least in part on comparing a probability distribution of the noise-carrying IMF to the GGD, wherein the probability distribution of the noise-carrying IMF has a shape that follows the corresponding shape of the GGD.

13. The method of claim 12, wherein generating a reconstructed signal is based, at least in part, on an equation defined as:

$$\hat{y}(n) = \sum_{i=R}^{M} IMF_i(n) + \Re(n)$$

where (n) is a sample index, $\hat{y}(n)$ is a reconstructed signal, (M) is the total number of IMFs, $\Re(n)$ is a residue "trend" of $\hat{y}(n)$, and (R) is the identified reference IMF index.

14. The method of claim 12, wherein the GGD null hypothesis test comprises:

deriving a first generalized Gaussian distribution (GGD) cumulative distribution function (CDF) with a shape parameter ($\beta$) equal to a minimum shape value ($\beta_{min}$) for a target IMF of the array of IMFs;

converting the first GGD CDF to a first Gaussian PDF (Z) via a uniform distribution;

selecting a Gaussian test to perform based on kurtosis of the first Gaussian PDF (Z); and evaluating a null hypothesis of the first Gaussian PDF (Z) based on the selected Gaussian test, and in response to the first Gaussian PDF (Z) being normally distributed, identifying the target IMF as the noise-carrying IMF.

15. The method of claim 14, wherein the GGD null hypothesis test further comprises adjusting the shape parameter ($\beta$) by a step size ($\delta\beta$) from the minimum shape value $\beta_{min}$ up to a maximum shape value $\beta_{max}$ in response to the first Gaussian PDF (Z) not being normally distributed.

16. The method of claim 15, wherein the step size ($\delta\beta$) is equal to or greater than 0.001, and wherein the GGD null hypothesis test further comprises:

deriving a second generalized Gaussian distribution (GGD) cumulative distribution function (CDF) with the adjusted shape parameter ($\beta$) for the target IMF of the array of IMFs;

converting the second GGD CDF to a second Gaussian PDF (Z) via a uniform distribution;

selecting a Gaussian test to perform based on the kurtosis of the second Gaussian PDF (Z); and evaluating a null hypothesis of the second Gaussian PDF (Z) based on the selected Gaussian test, and in response to the second Gaussian PDF (Z) being normally distributed, identifying the target IMF as the noise-carrying IMF.

17. The method of claim 15, wherein the minimum shape value $\beta_{min}$ is equal to 1.0 and the maximum shape value $\beta_{max}$ is equal to 3.0.

18. The method of claim 15, wherein the GGD null hypothesis test identifies the target IMF as an information-carrying IMF in response to the shape parameter ($\beta$) being set equal to or greater than the maximum shape value $\beta_{max}$.

19. The method of claim 14, wherein the first GGD CDF is derived from an equation defined as:

$$F(x) = \frac{1}{2} + \text{sgn}(x-\mu)\frac{\hat{\gamma}\left[\frac{1}{\beta}, \left(\frac{|x-\mu|}{\rho}\right)^{\beta}\right]}{2\Gamma\left(\frac{1}{\beta}\right)}$$

where ($\beta$) is a parameter that controls a distribution tail, $\Gamma(.)$ is a gamma function, $\hat{\gamma}$ denotes a lower incomplete gamma function, (x) is input data signal samples, and ($\mu$) is a mean of the input data signal samples.

* * * * *